(12) United States Patent
Batra et al.

(10) Patent No.: US 7,532,661 B2
(45) Date of Patent: May 12, 2009

(54) ADDITIONAL HIERARCHICAL PREAMBLE FOR SUPPORT OF FDMA CHANNEL IN A MULTI-BAND OFDM SYSTEM

(75) Inventors: Anuj Batra, Dallas, TX (US); Jaiganesh Balakrishnan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 776 days.

(21) Appl. No.: 11/054,961

(22) Filed: Feb. 10, 2005

(65) Prior Publication Data

US 2005/0232342 A1    Oct. 20, 2005

Related U.S. Application Data

(60) Provisional application No. 60/563,640, filed on Apr. 19, 2004, provisional application No. 60/568,715, filed on May 5, 2004, provisional application No. 60/637,647, filed on Dec. 20, 2004.

(51) Int. Cl.
H04B 1/00 (2006.01)

(52) U.S. Cl. .................................. 375/147; 375/150

(58) Field of Classification Search ............... 375/136, 375/142, 147, 150
See application file for complete search history.

(56) References Cited

U.S. PATENT DOCUMENTS 6,574,267 B1    6/2003    Kanterakis et al.
6,619,759 B2    9/2003    Bradsen et al.

*Primary Examiner*—Emmanuel Bayard
(74) *Attorney, Agent, or Firm*—Steven A. Shaw; W. James Brady; Frederick J. Telecky, Jr.

(57) ABSTRACT

A wireless device 10, 12 that distinguishes between multiple piconets is provided. The wireless device 10, 12 includes a preamble component operable to provide a preamble for a wireless fixed frequency interleaving transmission. The wireless device 10, 12 also includes a correlator component operable to distinguish a wireless transmission based on the preamble. The preamble is based on a 128-length sequence 120, 136, 144, formed using a 16-length sequence and a 8-length sequence. The 16-length sequence is selected from the group consisting of a first 16-length sequence 110, a second 16-length sequence 132, and a third 16-length sequence 140. The 8-length sequence is selected from the group consisting of a first 8-length sequence 112, a second 8-length sequence 134, and a third 8-length sequence 144.

22 Claims, 10 Drawing Sheets

130

| SEQUENCE ELEMENT | VALUE | SEQUENCE ELEMENT | VALUE | SEQUENCE ELEMENT | VALUE | SEQUENCE ELEMENT | VALUE |
|---|---|---|---|---|---|---|---|
| $c'_1$ | 0.9574 | $c'_{33}$ | 0.8400 | $c'_{65}$ | 0.5859 | $c'_{97}$ | -0.8528 |
| $c'_2$ | 0.5270 | $c'_{34}$ | 1.3980 | $c'_{66}$ | 0.3053 | $c'_{98}$ | -0.6973 |
| $c'_3$ | 1.5929 | $c'_{35}$ | 1.1147 | $c'_{67}$ | 0.8948 | $c'_{99}$ | -1.2477 |
| $c'_4$ | -0.2500 | $c'_{36}$ | -0.4732 | $c'_{68}$ | -0.6744 | $c'_{100}$ | 0.6246 |
| $c'_5$ | -0.2536 | $c'_{37}$ | -1.7178 | $c'_{69}$ | -0.8901 | $c'_{101}$ | 0.7687 |
| $c'_6$ | -0.3023 | $c'_{38}$ | -0.8477 | $c'_{70}$ | -0.8133 | $c'_{102}$ | 0.7966 |
| $c'_7$ | 1.2907 | $c'_{39}$ | 1.5083 | $c'_{71}$ | 0.9201 | $c'_{103}$ | -1.2809 |
| $c'_8$ | -0.4258 | $c'_{40}$ | -1.4364 | $c'_{72}$ | -1.0841 | $c'_{104}$ | 1.1023 |
| $c'_9$ | 1.0012 | $c'_{41}$ | 0.3853 | $c'_{73}$ | -0.8036 | $c'_{105}$ | 0.4250 |
| $c'_{10}$ | 1.7704 | $c'_{42}$ | 1.5673 | $c'_{74}$ | -0.3105 | $c'_{106}$ | -0.1614 |
| $c'_{11}$ | 0.8593 | $c'_{43}$ | 0.0295 | $c'_{75}$ | -1.0514 | $c'_{107}$ | 0.7547 |
| $c'_{12}$ | -0.3719 | $c'_{44}$ | -0.4204 | $c'_{76}$ | 0.7644 | $c'_{108}$ | -0.6696 |
| $c'_{13}$ | -1.3465 | $c'_{45}$ | -1.4856 | $c'_{77}$ | 0.7301 | $c'_{109}$ | -0.3920 |
| $c'_{14}$ | -0.7419 | $c'_{46}$ | -0.8404 | $c'_{78}$ | 0.9788 | $c'_{110}$ | -0.7589 |
| $c'_{15}$ | 1.5350 | $c'_{47}$ | 1.0111 | $c'_{79}$ | -1.1305 | $c'_{111}$ | 0.6701 |
| $c'_{16}$ | -1.2800 | $c'_{48}$ | -1.4269 | $c'_{80}$ | 1.3257 | $c'_{112}$ | -0.9381 |
| $c'_{17}$ | 0.6955 | $c'_{49}$ | 0.3033 | $c'_{81}$ | 0.7801 | $c'_{113}$ | -0.7483 |
| $c'_{18}$ | 1.7204 | $c'_{50}$ | 0.7757 | $c'_{82}$ | 0.7867 | $c'_{114}$ | -0.9659 |
| $c'_{19}$ | 0.1643 | $c'_{51}$ | -0.1370 | $c'_{83}$ | 1.0996 | $c'_{115}$ | -0.9192 |
| $c'_{20}$ | -0.3347 | $c'_{52}$ | -0.5250 | $c'_{84}$ | -0.5623 | $c'_{116}$ | 0.3925 |
| $c'_{21}$ | -1.7244 | $c'_{53}$ | -1.1589 | $c'_{85}$ | -1.2227 | $c'_{117}$ | 1.2864 |
| $c'_{22}$ | -0.7447 | $c'_{54}$ | -0.8324 | $c'_{86}$ | -0.8223 | $c'_{118}$ | 0.6784 |
| $c'_{23}$ | 1.1141 | $c'_{55}$ | 0.6336 | $c'_{87}$ | 1.2074 | $c'_{119}$ | -1.0909 |
| $c'_{24}$ | -1.3541 | $c'_{56}$ | -1.2698 | $c'_{88}$ | -1.2338 | $c'_{120}$ | 1.1140 |
| $c'_{25}$ | -0.7293 | $c'_{57}$ | -0.7853 | $c'_{89}$ | 0.2957 | $c'_{121}$ | -0.6134 |
| $c'_{26}$ | 0.2682 | $c'_{58}$ | -0.7031 | $c'_{90}$ | 1.0999 | $c'_{122}$ | -1.5467 |
| $c'_{27}$ | -1.2401 | $c'_{59}$ | -1.1106 | $c'_{91}$ | -0.0201 | $c'_{123}$ | -0.3031 |
| $c'_{28}$ | 1.0527 | $c'_{60}$ | 0.6071 | $c'_{92}$ | -0.5860 | $c'_{124}$ | 0.9457 |
| $c'_{29}$ | 0.1199 | $c'_{61}$ | 0.7164 | $c'_{93}$ | -1.2284 | $c'_{125}$ | 1.9645 |
| $c'_{30}$ | 1.1496 | $c'_{62}$ | 0.8305 | $c'_{94}$ | -0.9215 | $c'_{126}$ | 1.4549 |
| $c'_{31}$ | -1.0544 | $c'_{63}$ | -1.2355 | $c'_{95}$ | 0.7941 | $c'_{127}$ | -1.2760 |
| $c'_{32}$ | 1.3176 | $c'_{64}$ | 1.1754 | $c'_{96}$ | -1.4128 | $c'_{128}$ | 2.2102 |

| SEQUENCE ELEMENT | VALUE | SEQUENCE ELEMENT | VALUE | SEQUENCE ELEMENT | VALUE | SEQUENCE ELEMENT | VALUE |
|---|---|---|---|---|---|---|---|
| $c_1$ | 1 | $c_{33}$ | 1 | $c_{65}$ | 1 | $c_{97}$ | -1 |
| $c_2$ | 1 | $c_{34}$ | 1 | $c_{66}$ | 1 | $c_{98}$ | -1 |
| $c_3$ | 1 | $c_{35}$ | 1 | $c_{67}$ | 1 | $c_{99}$ | -1 |
| $c_4$ | -1 | $c_{36}$ | -1 | $c_{68}$ | -1 | $c_{100}$ | 1 |
| $c_5$ | -1 | $c_{37}$ | -1 | $c_{69}$ | -1 | $c_{101}$ | 1 |
| $c_6$ | -1 | $c_{38}$ | -1 | $c_{70}$ | -1 | $c_{102}$ | 1 |
| $c_7$ | 1 | $c_{39}$ | 1 | $c_{71}$ | 1 | $c_{103}$ | -1 |
| $c_8$ | -1 | $c_{40}$ | -1 | $c_{72}$ | -1 | $c_{104}$ | 1 |
| $c_9$ | 1 | $c_{41}$ | 1 | $c_{73}$ | -1 | $c_{105}$ | 1 |
| $c_{10}$ | 1 | $c_{42}$ | 1 | $c_{74}$ | -1 | $c_{106}$ | 1 |
| $c_{11}$ | 1 | $c_{43}$ | 1 | $c_{75}$ | -1 | $c_{107}$ | 1 |
| $c_{12}$ | -1 | $c_{44}$ | -1 | $c_{76}$ | 1 | $c_{108}$ | -1 |
| $c_{13}$ | -1 | $c_{45}$ | -1 | $c_{77}$ | 1 | $c_{109}$ | -1 |
| $c_{14}$ | -1 | $c_{46}$ | -1 | $c_{78}$ | 1 | $c_{110}$ | -1 |
| $c_{15}$ | 1 | $c_{47}$ | 1 | $c_{79}$ | -1 | $c_{111}$ | 1 |
| $c_{16}$ | -1 | $c_{48}$ | -1 | $c_{80}$ | 1 | $c_{112}$ | -1 |
| $c_{17}$ | 1 | $c_{49}$ | 1 | $c_{81}$ | 1 | $c_{113}$ | -1 |
| $c_{18}$ | 1 | $c_{50}$ | 1 | $c_{82}$ | 1 | $c_{114}$ | -1 |
| $c_{19}$ | 1 | $c_{51}$ | 1 | $c_{83}$ | 1 | $c_{115}$ | -1 |
| $c_{20}$ | -1 | $c_{52}$ | -1 | $c_{84}$ | -1 | $c_{116}$ | 1 |
| $c_{21}$ | -1 | $c_{53}$ | -1 | $c_{85}$ | -1 | $c_{117}$ | 1 |
| $c_{22}$ | -1 | $c_{54}$ | -1 | $c_{86}$ | -1 | $c_{118}$ | 1 |
| $c_{23}$ | 1 | $c_{55}$ | 1 | $c_{87}$ | 1 | $c_{119}$ | -1 |
| $c_{24}$ | -1 | $c_{56}$ | -1 | $c_{88}$ | -1 | $c_{120}$ | 1 |
| $c_{25}$ | -1 | $c_{57}$ | -1 | $c_{89}$ | 1 | $c_{121}$ | -1 |
| $c_{26}$ | -1 | $c_{58}$ | -1 | $c_{90}$ | 1 | $c_{122}$ | -1 |
| $c_{27}$ | -1 | $c_{59}$ | -1 | $c_{91}$ | 1 | $c_{123}$ | -1 |
| $c_{28}$ | 1 | $c_{60}$ | 1 | $c_{92}$ | -1 | $c_{124}$ | 1 |
| $c_{29}$ | 1 | $c_{61}$ | 1 | $c_{93}$ | -1 | $c_{125}$ | 1 |
| $c_{30}$ | 1 | $c_{62}$ | 1 | $c_{94}$ | -1 | $c_{126}$ | 1 |
| $c_{31}$ | -1 | $c_{63}$ | -1 | $c_{95}$ | 1 | $c_{127}$ | -1 |
| $c_{32}$ | 1 | $c_{64}$ | 1 | $c_{96}$ | -1 | $c_{128}$ | 1 |

| SEQUENCE ELEMENT | VALUE | SEQUENCE ELEMENT | VALUE | SEQUENCE ELEMENT | VALUE | SEQUENCE ELEMENT | VALUE |
|---|---|---|---|---|---|---|---|
| $c'_1$ | 0.9574 | $c'_{33}$ | 0.8400 | $c'_{65}$ | 0.5859 | $c'_{97}$ | -0.8528 |
| $c'_2$ | 0.5270 | $c'_{34}$ | 1.3980 | $c'_{66}$ | 0.3053 | $c'_{98}$ | -0.6973 |
| $c'_3$ | 1.5929 | $c'_{35}$ | 1.1147 | $c'_{67}$ | 0.8948 | $c'_{99}$ | -1.2477 |
| $c'_4$ | -0.2500 | $c'_{36}$ | -0.4732 | $c'_{68}$ | -0.6744 | $c'_{100}$ | 0.6246 |
| $c'_5$ | -0.2536 | $c'_{37}$ | -1.7178 | $c'_{69}$ | -0.8901 | $c'_{101}$ | 0.7687 |
| $c'_6$ | -0.3023 | $c'_{38}$ | -0.8477 | $c'_{70}$ | -0.8133 | $c'_{102}$ | 0.7966 |
| $c'_7$ | 1.2907 | $c'_{39}$ | 1.5083 | $c'_{71}$ | 0.9201 | $c'_{103}$ | -1.2809 |
| $c'_8$ | -0.4258 | $c'_{40}$ | -1.4364 | $c'_{72}$ | -1.0841 | $c'_{104}$ | 1.1023 |
| $c'_9$ | 1.0012 | $c'_{41}$ | 0.3853 | $c'_{73}$ | -0.8036 | $c'_{105}$ | 0.4250 |
| $c'_{10}$ | 1.7704 | $c'_{42}$ | 1.5673 | $c'_{74}$ | -0.3105 | $c'_{106}$ | -0.1614 |
| $c'_{11}$ | 0.8593 | $c'_{43}$ | 0.0295 | $c'_{75}$ | -1.0514 | $c'_{107}$ | 0.7547 |
| $c'_{12}$ | -0.3719 | $c'_{44}$ | -0.4204 | $c'_{76}$ | 0.7644 | $c'_{108}$ | -0.6696 |
| $c'_{13}$ | -1.3465 | $c'_{45}$ | -1.4856 | $c'_{77}$ | 0.7301 | $c'_{109}$ | -0.3920 |
| $c'_{14}$ | -0.7419 | $c'_{46}$ | -0.8404 | $c'_{78}$ | 0.9788 | $c'_{110}$ | -0.7589 |
| $c'_{15}$ | 1.5350 | $c'_{47}$ | 1.0111 | $c'_{79}$ | -1.1305 | $c'_{111}$ | 0.6701 |
| $c'_{16}$ | -1.2800 | $c'_{48}$ | -1.4269 | $c'_{80}$ | 1.3257 | $c'_{112}$ | -0.9381 |
| $c'_{17}$ | 0.6955 | $c'_{49}$ | 0.3033 | $c'_{81}$ | 0.7801 | $c'_{113}$ | -0.7483 |
| $c'_{18}$ | 1.7204 | $c'_{50}$ | 0.7757 | $c'_{82}$ | 0.7867 | $c'_{114}$ | -0.9659 |
| $c'_{19}$ | 0.1643 | $c'_{51}$ | -0.1370 | $c'_{83}$ | 1.0996 | $c'_{115}$ | -0.9192 |
| $c'_{20}$ | -0.3347 | $c'_{52}$ | -0.5250 | $c'_{84}$ | -0.5623 | $c'_{116}$ | 0.3925 |
| $c'_{21}$ | -1.7244 | $c'_{53}$ | -1.1589 | $c'_{85}$ | -1.2227 | $c'_{117}$ | 1.2864 |
| $c'_{22}$ | -0.7447 | $c'_{54}$ | -0.8324 | $c'_{86}$ | -0.8223 | $c'_{118}$ | 0.6784 |
| $c'_{23}$ | 1.1141 | $c'_{55}$ | 0.6336 | $c'_{87}$ | 1.2074 | $c'_{119}$ | -1.0909 |
| $c'_{24}$ | -1.3541 | $c'_{56}$ | -1.2698 | $c'_{88}$ | -1.2338 | $c'_{120}$ | 1.1140 |
| $c'_{25}$ | -0.7293 | $c'_{57}$ | -0.7853 | $c'_{89}$ | 0.2957 | $c'_{121}$ | -0.6134 |
| $c'_{26}$ | 0.2682 | $c'_{58}$ | -0.7031 | $c'_{90}$ | 1.0999 | $c'_{122}$ | -1.5467 |
| $c'_{27}$ | -1.2401 | $c'_{59}$ | -1.1106 | $c'_{91}$ | -0.0201 | $c'_{123}$ | -0.3031 |
| $c'_{28}$ | 1.0527 | $c'_{60}$ | 0.6071 | $c'_{92}$ | -0.5860 | $c'_{124}$ | 0.9457 |
| $c'_{29}$ | 0.1199 | $c'_{61}$ | 0.7164 | $c'_{93}$ | -1.2284 | $c'_{125}$ | 1.9645 |
| $c'_{30}$ | 1.1496 | $c'_{62}$ | 0.8305 | $c'_{94}$ | -0.9215 | $c'_{126}$ | 1.4549 |
| $c'_{31}$ | -1.0544 | $c'_{63}$ | -1.2355 | $c'_{95}$ | 0.7941 | $c'_{127}$ | -1.2760 |
| $c'_{32}$ | 1.3176 | $c'_{64}$ | 1.1754 | $c'_{96}$ | -1.4128 | $c'_{128}$ | 2.2102 |

*FIG. 4b*

| SEQUENCE ELEMENT | VALUE | SEQUENCE ELEMENT | VALUE | SEQUENCE ELEMENT | VALUE | SEQUENCE ELEMENT | VALUE |
|---|---|---|---|---|---|---|---|
| $F_1$ | 1 | $F_{33}$ | -1 | $F_{65}$ | 1 | $F_{97}$ | 1 |
| $F_2$ | -1 | $F_{34}$ | 1 | $F_{66}$ | -1 | $F_{98}$ | -1 |
| $F_3$ | 1 | $F_{35}$ | -1 | $F_{67}$ | 1 | $F_{99}$ | 1 |
| $F_4$ | 1 | $F_{36}$ | -1 | $F_{68}$ | 1 | $F_{100}$ | 1 |
| $F_5$ | 1 | $F_{37}$ | -1 | $F_{69}$ | 1 | $F_{101}$ | 1 |
| $F_6$ | -1 | $F_{38}$ | 1 | $F_{70}$ | -1 | $F_{102}$ | -1 |
| $F_7$ | -1 | $F_{39}$ | 1 | $F_{71}$ | -1 | $F_{103}$ | -1 |
| $F_8$ | -1 | $F_{40}$ | 1 | $F_{72}$ | -1 | $F_{104}$ | -1 |
| $F_9$ | 1 | $F_{41}$ | 1 | $F_{73}$ | -1 | $F_{105}$ | 1 |
| $F_{10}$ | -1 | $F_{42}$ | -1 | $F_{74}$ | 1 | $F_{106}$ | -1 |
| $F_{11}$ | 1 | $F_{43}$ | 1 | $F_{75}$ | -1 | $F_{107}$ | 1 |
| $F_{12}$ | 1 | $F_{44}$ | 1 | $F_{76}$ | -1 | $F_{108}$ | 1 |
| $F_{13}$ | 1 | $F_{45}$ | 1 | $F_{77}$ | -1 | $F_{109}$ | 1 |
| $F_{14}$ | -1 | $F_{46}$ | -1 | $F_{78}$ | 1 | $F_{110}$ | -1 |
| $F_{15}$ | -1 | $F_{47}$ | -1 | $F_{79}$ | 1 | $F_{111}$ | -1 |
| $F_{16}$ | -1 | $F_{48}$ | -1 | $F_{80}$ | 1 | $F_{112}$ | -1 |
| $F_{17}$ | -1 | $F_{49}$ | -1 | $F_{81}$ | 1 | $F_{113}$ | -1 |
| $F_{18}$ | 1 | $F_{50}$ | 1 | $F_{82}$ | -1 | $F_{114}$ | 1 |
| $F_{19}$ | -1 | $F_{51}$ | -1 | $F_{83}$ | 1 | $F_{115}$ | -1 |
| $F_{20}$ | -1 | $F_{52}$ | -1 | $F_{84}$ | 1 | $F_{116}$ | -1 |
| $F_{21}$ | -1 | $F_{53}$ | -1 | $F_{85}$ | 1 | $F_{117}$ | -1 |
| $F_{22}$ | 1 | $F_{54}$ | 1 | $F_{86}$ | -1 | $F_{118}$ | 1 |
| $F_{23}$ | 1 | $F_{55}$ | 1 | $F_{87}$ | -1 | $F_{119}$ | 1 |
| $F_{24}$ | 1 | $F_{56}$ | 1 | $F_{88}$ | -1 | $F_{120}$ | 1 |
| $F_{25}$ | 1 | $F_{57}$ | 1 | $F_{89}$ | 1 | $F_{121}$ | -1 |
| $F_{26}$ | -1 | $F_{58}$ | -1 | $F_{90}$ | -1 | $F_{122}$ | 1 |
| $F_{27}$ | 1 | $F_{59}$ | 1 | $F_{91}$ | 1 | $F_{123}$ | -1 |
| $F_{28}$ | 1 | $F_{60}$ | 1 | $F_{92}$ | 1 | $F_{124}$ | -1 |
| $F_{29}$ | 1 | $F_{61}$ | 1 | $F_{93}$ | 1 | $F_{125}$ | -1 |
| $F_{30}$ | -1 | $F_{62}$ | -1 | $F_{94}$ | -1 | $F_{126}$ | 1 |
| $F_{31}$ | -1 | $F_{63}$ | -1 | $F_{95}$ | -1 | $F_{127}$ | 1 |
| $F_{32}$ | -1 | $F_{64}$ | -1 | $F_{96}$ | -1 | $F_{128}$ | 1 |

| SEQUENCE ELEMENT | VALUE | SEQUENCE ELEMENT | VALUE | SEQUENCE ELEMENT | VALUE | SEQUENCE ELEMENT | VALUE |
|---|---|---|---|---|---|---|---|
| $F'_1$ | 1.2947 | $F'_{33}$ | -0.9973 | $F'_{65}$ | 1.0703 | $F'_{97}$ | 0.9516 |
| $F'_2$ | -0.8188 | $F'_{34}$ | 0.8548 | $F'_{66}$ | -0.8625 | $F'_{98}$ | -1.2593 |
| $F'_3$ | 0.9007 | $F'_{35}$ | -0.6963 | $F'_{67}$ | 0.6986 | $F'_{99}$ | 0.4594 |
| $F'_4$ | 0.7786 | $F'_{36}$ | -0.6874 | $F'_{68}$ | 1.0989 | $F'_{100}$ | 1.3038 |
| $F'_5$ | 0.6301 | $F'_{37}$ | -0.5015 | $F'_{69}$ | 0.4600 | $F'_{101}$ | 0.1090 |
| $F'_6$ | -0.1283 | $F'_{38}$ | 0.7003 | $F'_{70}$ | -0.6559 | $F'_{102}$ | -0.5082 |
| $F'_7$ | -0.7972 | $F'_{39}$ | 0.3582 | $F'_{71}$ | -0.6087 | $F'_{103}$ | -1.8181 |
| $F'_8$ | -0.3897 | $F'_{40}$ | 0.5772 | $F'_{72}$ | -0.4206 | $F'_{104}$ | -0.7747 |
| $F'_9$ | 1.1794 | $F'_{41}$ | 0.7421 | $F'_{73}$ | -0.8454 | $F'_{105}$ | 0.7678 |
| $F'_{10}$ | -1.2592 | $F'_{42}$ | -0.6766 | $F'_{74}$ | 1.0317 | $F'_{106}$ | -1.5342 |
| $F'_{11}$ | 0.8136 | $F'_{43}$ | 0.6242 | $F'_{75}$ | -0.7624 | $F'_{107}$ | 0.4914 |
| $F'_{12}$ | 0.8872 | $F'_{44}$ | 0.4241 | $F'_{76}$ | 0.0619 | $F'_{108}$ | 0.7197 |
| $F'_{13}$ | 0.5797 | $F'_{45}$ | 0.5891 | $F'_{77}$ | -0.7311 | $F'_{109}$ | 0.3353 |
| $F'_{14}$ | -1.2304 | $F'_{46}$ | -0.9045 | $F'_{78}$ | 1.3634 | $F'_{110}$ | -1.5832 |
| $F'_{15}$ | -0.5628 | $F'_{47}$ | 0.1625 | $F'_{79}$ | -0.1379 | $F'_{111}$ | -0.9947 |
| $F'_{16}$ | -0.8272 | $F'_{48}$ | -0.5105 | $F'_{80}$ | 0.8401 | $F'_{112}$ | -1.0329 |
| $F'_{17}$ | -1.5418 | $F'_{49}$ | -1.4187 | $F'_{81}$ | 1.6371 | $F'_{113}$ | -1.9669 |
| $F'_{18}$ | 1.2804 | $F'_{50}$ | 1.5169 | $F'_{82}$ | -1.0201 | $F'_{114}$ | 0.9946 |
| $F'_{19}$ | -1.1524 | $F'_{51}$ | -0.9580 | $F'_{83}$ | 0.9243 | $F'_{115}$ | -1.3273 |
| $F'_{20}$ | -0.9846 | $F'_{52}$ | -1.1237 | $F'_{84}$ | 2.0931 | $F'_{116}$ | -1.5572 |
| $F'_{21}$ | -0.9718 | $F'_{53}$ | -0.6782 | $F'_{85}$ | 0.4511 | $F'_{117}$ | -0.8746 |
| $F'_{22}$ | 1.1834 | $F'_{54}$ | 1.3557 | $F'_{86}$ | 0.0768 | $F'_{118}$ | 0.0579 |
| $F'_{23}$ | 0.4293 | $F'_{55}$ | 1.0229 | $F'_{87}$ | -1.7974 | $F'_{119}$ | 1.2269 |
| $F'_{24}$ | 0.9021 | $F'_{56}$ | 0.9490 | $F'_{88}$ | -0.4685 | $F'_{120}$ | 0.4497 |
| $F'_{25}$ | 1.1152 | $F'_{57}$ | 1.6308 | $F'_{89}$ | 1.4727 | $F'_{121}$ | -1.4751 |
| $F'_{26}$ | -0.9828 | $F'_{58}$ | -0.9325 | $F'_{90}$ | -1.3387 | $F'_{122}$ | 1.3897 |
| $F'_{27}$ | 0.7891 | $F'_{59}$ | 1.1461 | $F'_{91}$ | 0.7779 | $F'_{123}$ | -0.9922 |
| $F'_{28}$ | 0.9391 | $F'_{60}$ | 1.1675 | $F'_{92}$ | 2.0080 | $F'_{124}$ | -1.2950 |
| $F'_{29}$ | 0.5944 | $F'_{61}$ | 0.8163 | $F'_{93}$ | 0.3026 | $F'_{125}$ | -0.6839 |
| $F'_{30}$ | -0.8376 | $F'_{62}$ | -0.1551 | $F'_{94}$ | -0.4263 | $F'_{126}$ | 1.2113 |
| $F'_{31}$ | -0.5320 | $F'_{63}$ | -0.8657 | $F'_{95}$ | -1.9751 | $F'_{127}$ | 1.0559 |
| $F'_{32}$ | -0.6335 | $F'_{64}$ | -0.3696 | $F'_{96}$ | -0.8421 | $F'_{128}$ | 0.8147 |

*FIG. 5c*

| SEQUENCE ELEMENT | VALUE | SEQUENCE ELEMENT | VALUE | SEQUENCE ELEMENT | VALUE | SEQUENCE ELEMENT | VALUE |
|---|---|---|---|---|---|---|---|
| $J_1$ | 1 | $J_{33}$ | -1 | $J_{65}$ | -1 | $J_{97}$ | -1 |
| $J_2$ | 1 | $J_{34}$ | -1 | $J_{66}$ | -1 | $J_{98}$ | -1 |
| $J_3$ | 1 | $J_{35}$ | -1 | $J_{67}$ | -1 | $J_{99}$ | -1 |
| $J_4$ | -1 | $J_{36}$ | 1 | $J_{68}$ | 1 | $J_{100}$ | 1 |
| $J_5$ | -1 | $J_{37}$ | 1 | $J_{69}$ | 1 | $J_{101}$ | 1 |
| $J_6$ | -1 | $J_{38}$ | 1 | $J_{70}$ | 1 | $J_{102}$ | 1 |
| $J_7$ | 1 | $J_{39}$ | -1 | $J_{71}$ | -1 | $J_{103}$ | -1 |
| $J_8$ | -1 | $J_{40}$ | 1 | $J_{72}$ | 1 | $J_{104}$ | 1 |
| $J_9$ | 1 | $J_{41}$ | -1 | $J_{73}$ | 1 | $J_{105}$ | 1 |
| $J_{10}$ | 1 | $J_{42}$ | -1 | $J_{74}$ | 1 | $J_{106}$ | 1 |
| $J_{11}$ | 1 | $J_{43}$ | -1 | $J_{75}$ | 1 | $J_{107}$ | 1 |
| $J_{12}$ | -1 | $J_{44}$ | 1 | $J_{76}$ | -1 | $J_{108}$ | -1 |
| $J_{13}$ | -1 | $J_{45}$ | 1 | $J_{77}$ | -1 | $J_{109}$ | -1 |
| $J_{14}$ | -1 | $J_{46}$ | 1 | $J_{78}$ | -1 | $J_{110}$ | -1 |
| $J_{15}$ | 1 | $J_{47}$ | -1 | $J_{79}$ | 1 | $J_{111}$ | 1 |
| $J_{16}$ | -1 | $J_{48}$ | 1 | $J_{80}$ | -1 | $J_{112}$ | -1 |
| $J_{17}$ | -1 | $J_{49}$ | 1 | $J_{81}$ | -1 | $J_{113}$ | -1 |
| $J_{18}$ | -1 | $J_{50}$ | 1 | $J_{82}$ | -1 | $J_{114}$ | -1 |
| $J_{19}$ | -1 | $J_{51}$ | 1 | $J_{83}$ | -1 | $J_{115}$ | -1 |
| $J_{20}$ | 1 | $J_{52}$ | -1 | $J_{84}$ | 1 | $J_{116}$ | 1 |
| $J_{21}$ | 1 | $J_{53}$ | -1 | $J_{85}$ | 1 | $J_{117}$ | 1 |
| $J_{22}$ | 1 | $J_{54}$ | -1 | $J_{86}$ | 1 | $J_{118}$ | 1 |
| $J_{23}$ | -1 | $J_{55}$ | 1 | $J_{87}$ | -1 | $J_{119}$ | -1 |
| $J_{24}$ | 1 | $J_{56}$ | -1 | $J_{88}$ | 1 | $J_{120}$ | 1 |
| $J_{25}$ | -1 | $J_{57}$ | -1 | $J_{89}$ | 1 | $J_{121}$ | -1 |
| $J_{26}$ | -1 | $J_{58}$ | -1 | $J_{90}$ | 1 | $J_{122}$ | -1 |
| $J_{27}$ | -1 | $J_{59}$ | -1 | $J_{91}$ | 1 | $J_{123}$ | -1 |
| $J_{28}$ | 1 | $J_{60}$ | 1 | $J_{92}$ | -1 | $J_{124}$ | 1 |
| $J_{29}$ | 1 | $J_{61}$ | 1 | $J_{93}$ | -1 | $J_{125}$ | 1 |
| $J_{30}$ | 1 | $J_{62}$ | 1 | $J_{94}$ | -1 | $J_{126}$ | 1 |
| $J_{31}$ | -1 | $J_{63}$ | -1 | $J_{95}$ | 1 | $J_{127}$ | -1 |
| $J_{32}$ | 1 | $J_{64}$ | 1 | $J_{96}$ | -1 | $J_{128}$ | 1 |

*FIG. 6b*

| SEQUENCE ELEMENT | VALUE | SEQUENCE ELEMENT | VALUE | SEQUENCE ELEMENT | VALUE | SEQUENCE ELEMENT | VALUE |
|---|---|---|---|---|---|---|---|
| $J'_1$ | 0.8147 | $J'_{33}$ | -0.8421 | $J'_{65}$ | -0.3696 | $J'_{97}$ | -0.6335 |
| $J'_2$ | 1.0559 | $J'_{34}$ | -1.9751 | $J'_{66}$ | -0.8657 | $J'_{98}$ | -0.5320 |
| $J'_3$ | 1.2113 | $J'_{35}$ | -0.4263 | $J'_{67}$ | -0.1551 | $J'_{99}$ | -0.8376 |
| $J'_4$ | -0.6839 | $J'_{36}$ | 0.3026 | $J'_{68}$ | 0.8163 | $J'_{100}$ | 0.5944 |
| $J'_5$ | -1.2950 | $J'_{37}$ | 2.0080 | $J'_{69}$ | 1.1675 | $J'_{101}$ | 0.9391 |
| $J'_6$ | -0.9922 | $J'_{38}$ | 0.7779 | $J'_{70}$ | 1.1461 | $J'_{102}$ | 0.7891 |
| $J'_7$ | 1.3987 | $J'_{39}$ | -1.3387 | $J'_{71}$ | -0.9325 | $J'_{103}$ | -0.9828 |
| $J'_8$ | -1.4751 | $J'_{40}$ | 1.4727 | $J'_{72}$ | 1.6308 | $J'_{104}$ | 1.1152 |
| $J'_9$ | 0.4497 | $J'_{41}$ | -0.4685 | $J'_{73}$ | 0.9490 | $J'_{105}$ | 0.9021 |
| $J'_{10}$ | 1.2269 | $J'_{42}$ | -1.7974 | $J'_{74}$ | 1.0229 | $J'_{106}$ | 0.4293 |
| $J'_{11}$ | 0.0579 | $J'_{43}$ | 0.0768 | $J'_{75}$ | 1.3557 | $J'_{107}$ | 1.1834 |
| $J'_{12}$ | -0.8746 | $J'_{44}$ | 0.4511 | $J'_{76}$ | -0.6782 | $J'_{108}$ | -0.9178 |
| $J'_{13}$ | -1.5572 | $J'_{45}$ | 2.0931 | $J'_{77}$ | -1.1237 | $J'_{109}$ | -0.9846 |
| $J'_{14}$ | -1.3273 | $J'_{46}$ | 0.9243 | $J'_{78}$ | -0.9580 | $J'_{110}$ | -1.1524 |
| $J'_{15}$ | 0.9946 | $J'_{47}$ | -1.0201 | $J'_{79}$ | 1.5169 | $J'_{111}$ | 1.2804 |
| $J'_{16}$ | -1.9669 | $J'_{48}$ | 1.6371 | $J'_{80}$ | -1.4187 | $J'_{112}$ | -1.5418 |
| $J'_{17}$ | -1.0329 | $J'_{49}$ | 0.8401 | $J'_{81}$ | -0.5105 | $J'_{113}$ | -0.8272 |
| $J'_{18}$ | -0.9947 | $J'_{50}$ | -0.1379 | $J'_{82}$ | 0.1625 | $J'_{114}$ | -0.5628 |
| $J'_{19}$ | -1.5832 | $J'_{51}$ | 1.3634 | $J'_{83}$ | -0.9045 | $J'_{115}$ | -1.2304 |
| $J'_{20}$ | 0.3353 | $J'_{52}$ | -0.7311 | $J'_{84}$ | 0.5891 | $J'_{116}$ | 0.5797 |
| $J'_{21}$ | 0.7197 | $J'_{53}$ | 0.0619 | $J'_{85}$ | 0.4241 | $J'_{117}$ | 0.8872 |
| $J'_{22}$ | 0.4914 | $J'_{54}$ | -0.7624 | $J'_{86}$ | 0.6242 | $J'_{118}$ | 0.8136 |
| $J'_{23}$ | -1.5342 | $J'_{55}$ | 1.0317 | $J'_{87}$ | -0.6766 | $J'_{119}$ | -1.2592 |
| $J'_{24}$ | 0.7678 | $J'_{56}$ | -0.8454 | $J'_{88}$ | 0.7421 | $J'_{120}$ | 1.1794 |
| $J'_{25}$ | -0.7747 | $J'_{57}$ | -0.4206 | $J'_{89}$ | 0.5772 | $J'_{121}$ | -0.3897 |
| $J'_{26}$ | -1.8181 | $J'_{58}$ | -0.6087 | $J'_{90}$ | 0.3582 | $J'_{122}$ | -0.7972 |
| $J'_{27}$ | -0.5082 | $J'_{59}$ | -0.6559 | $J'_{91}$ | 0.7003 | $J'_{123}$ | -0.1283 |
| $J'_{28}$ | 0.1090 | $J'_{60}$ | 0.4600 | $J'_{92}$ | -0.5015 | $J'_{124}$ | 0.6301 |
| $J'_{29}$ | 1.3038 | $J'_{61}$ | 1.0989 | $J'_{93}$ | -0.6874 | $J'_{125}$ | 0.7786 |
| $J'_{30}$ | 0.4594 | $J'_{62}$ | 0.6986 | $J'_{94}$ | -0.6963 | $J'_{126}$ | 0.9007 |
| $J'_{31}$ | -1.2593 | $J'_{63}$ | -0.8625 | $J'_{95}$ | 0.8548 | $J'_{127}$ | -0.8188 |
| $J'_{32}$ | 0.9516 | $J'_{64}$ | 1.0703 | $J'_{96}$ | -0.9973 | $J'_{128}$ | 1.2947 |

*FIG. 6c*

ADDITIONAL HIERARCHICAL PREAMBLE FOR SUPPORT OF FDMA CHANNEL IN A MULTI-BAND OFDM SYSTEM

CROSS-REFERENCE TO RELATED APPLICATIONS

This application claims priority to U.S. Provisional Application No. 60/563,640 filed Apr. 19, 2004, and entitled "Additional Hierarchical Preamble for Support of FDMA Channel in a Multi-band OFDM System," by Anuj Batra et al, and to U.S. Provisional Application No. 60/568,715 filed May 5, 2004, and entitled "New (Updated) Preamble for FDMA," by Anuj Batra et al, incorporated herein by reference, and to U.S. Provisional Application No. 60/637,647 filed Dec. 20, 2004, entitled "Additional Preambles for FDMA", by Anuj Batra et al., all of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to wireless communications, and more particularly, but not by way of limitation, to a method for discriminating orthogonal frequency division modulated signals transmitted by frequency division multiple access piconets based on three preambles.

BACKGROUND OF THE INVENTION

A network provides for communication among members of the network. Wireless networks allow connectionless communications. Wireless local area networks (WLANS) with ranges of about 100 meters or so have become increasingly popular. Wireless local area networks are generally tailored for use by computers and provide fairly sophisticated protocols to promote communications. Wireless personal area networks with ranges of about 10 meters are poised for growth, and increasing engineering development effort is committed to developing protocols supporting personal area networks.

With limited range, wireless personal area networks may have fewer members and require less power than wireless local area networks. The IEEE (Institute of Electrical and Electronics Engineers) is developing an IEEE 802.15.3a wireless personal area network standard directed to high data rate communications. The term piconet refers to a wireless personal area network having an ad hoc topology comprising communicating devices coordinated by a piconet controller (PNC). Piconets may form, reform, and abate spontaneously as various wireless devices enter and leave each other's proximity. Piconets may be characterized by their limited temporal and spatial extent. Physically adjacent wireless devices may group themselves into multiple piconets running simultaneously.

One proposal to the IEEE 802.15.3a task group is the multi-band orthogonal frequency division modulation (MB-OFDM) proposal developed by the MB-OFDM alliance (MBOA) special interest group (SIG) that divides an approximately 7.5 GHz bandwidth from about 3.1 GHz to 10.6 GHz into fourteen 528 MHz wide bands. These fourteen bands are organized into four band groups each having three 528 MHz bands and one band group of two 528 MHz bands. An example piconet may transmit a first MB-OFDM symbol in a first 312.5 nS duration time interval in a first frequency band of a band group, a second MB-OFDM symbol in a second 312.5 nS duration time interval in a second frequency band of the band group, and a third MB-OFDM symbol in a third 312.5 nS duration time interval in a third frequency band of the band group. Other piconets may also transmit concurrently using the same band group, discriminating themselves by using different time-frequency codes and a distinguishing preamble sequence. This method of piconets sharing a band group by transmitting on each of the three 528 MHz wide frequencies of the band group may be referred to as time frequency coding or time frequency interleaving (TFI). Alternately, piconets may transmit exclusively on one frequency band of the band group which may be referred to as fixed frequency interleaving (FFI). Piconets employing fixed frequency interleaving may distinguish themselves from other piconets employing time frequency interleaving by using a distinguishing preamble sequence. In practice four distinct preamble sequences may be allocated for time frequency interleaving identification purposes and three distinct preamble sequences may be allocated for fixed frequency interleaving. In different piconets different time-frequency codes may be used. In addition, different piconets may use different preamble sequences.

The structure of a message package according to the MB-OFDM SIG physical layer specification comprises a preamble field, a header field, and a payload field. The preamble field may contain multiple instances of the distinct preamble sequence. The preamble field may be subdivided into a packet and frame detection sequence and a channel estimation sequence. The channel estimation sequence is a known sequence that may be used by a receiver to estimate the characteristics of the wireless communication channel to effectively compensate for adverse channel conditions. The preamble field, the header field, and the payload field may each be subdivided into a plurality of OFDM symbols.

SUMMARY OF THE INVENTION

According to one embodiment, a wireless device that distinguishes between multiple piconets is provided. The wireless device includes a preamble component operable to provide a preamble for a wireless fixed frequency interleaving transmission. The wireless device also includes a correlator component operable to distinguish a wireless transmission based on the preamble. The preamble is based on a 128-length sequence formed using a 16-length sequence and a 8-length sequence. The 16-length sequence is selected from the group consisting of a first 16-length sequence, a second 16-length sequence, and a third 16-length sequence. The 8-length sequence is selected from the group consisting of a first 8-length sequence, a second 8-length sequence, and a third 8-length sequence.

In another embodiment, a wireless device to distinguish communications is provided. The wireless device includes a component operable for fixed frequency interleaved communication using a 128-length preamble based on any one of a first 8-length and 16-length sequence, a second 8-length and 16-length sequence, and a third 8-length and 16-length sequence.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 3 illustrates the first 128-length sequence according to one embodiment.

FIG. 5b illustrates the second 128-length sequence according to one embodiment.

FIG. 5c illustrates a second 128-length spectrally flattened preamble sequence, based on the second 128-length sequence, according to one embodiment.

FIG. 6b illustrates the third 128-length sequence according to one embodiment.

FIG. 6c illustrates a third 128-length spectrally flattened preamble sequence, based on the third 128-length sequence, according to one embodiment.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Piconets may transmit exclusively on one frequency band of the band group, which may be referred to as fixed frequency interleaving (FFI). FFI may also be referred to as frequency division multiple access (FDMA). The use of FFI may permit further reduction of the minimum allowable physical separation between separate piconets relative to the use of time frequency interleaving. Piconets employing FFI, also referred to as FFI piconets, may distinguish their transmissions from transmissions of time frequency interleaving (TFI) piconets by using a distinguishing preamble sequence. Additionallly, a first FFI piconet may distinguish its transmissions from transmissions of other FFI piconets by employing a frequency band unique preamble, a unique preamble for each of the three frequency bands of the band group. For example, a first FFI piconet may employ a first preamble to transmit on a first frequency of a band group, a second FFI piconet may employ a second preamble to transmit on a second frequency of the band group, and a third FFI piconet may employ a third preamble to transmit on a third frequency of the band group. In this case, FFI piconets may distinguish themselves from each other by frequency and/or preamble. Using distinguishing preambles may permit employing lower quality filters in receivers and/or transmitters and hence reduction of per unit manufacturing cost of wireless devices.

In general, it may be preferable that each preamble for FFI have a zero average value, autocorrelate strongly to itself, have a weak first side lobe autocorrelation, and crosscorrelate weakly with the four predefined time frequency interleaving preambles and the remaining two FFI preambles. Additionally, power conservation advantages may be realized in a circuit implementation of a receiver if the fixed frequency interleaving preamble is a hierarchical sequence. For purposes of the present disclosure, a hierarchical sequence is defined to include a sequence of bi-phase values that may be formed by spreading a first sequence of bi-phase values with a second sequence of bi-phase values. This definition of hierarchical sequences also includes sequences of bi-phase values read from memory rather than constructing the sequence of bi-phase values using spreading.

Figure 1:
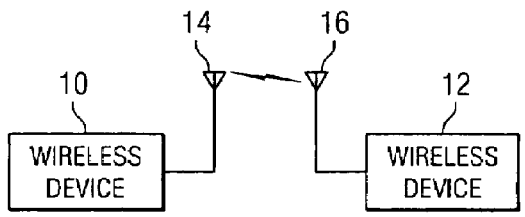
FIG. 1 is a diagram of two devices in wireless communication according to an embodiment.

Turning to FIG. 1, a block diagram of two wireless devices in wireless communication are depicted. A first wireless device 10 is in communication with a second wireless device 12. Both the first wireless device 10 and the second wireless device 12 contain receiver-transmitter assemblies used for transmitting and receiving messages. The first wireless device 10 has a first antenna 14 which it employs to transmit and receive messages. The second wireless device 12 has a second antenna 16 which it employs to transmit and receive messages. The first and second wireless devices 10, 12 are operable for communication using the preambles according to various embodiments of the present disclosure.

Figure 2A:
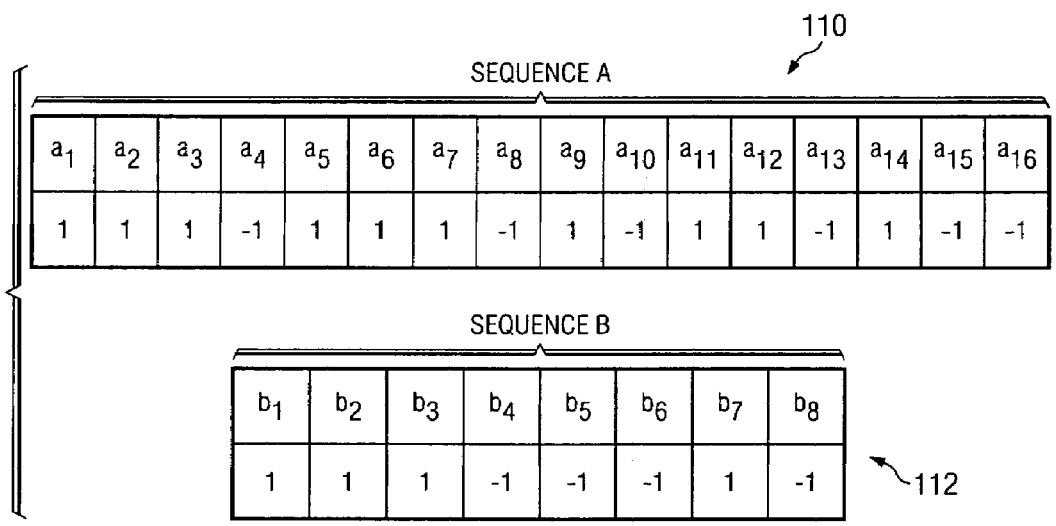
FIG. 2a illustrates a first 16-length bi-phase valued sequence and a first 8-length bi-phase valued sequence for generating a first 128-length sequence according to one embodiment of the present disclosure.

Turning to FIG. 2a, two numerical sequences are depicted that may be used to generate one of the preambles. A sequence A 110 has length 16 and a sequence B 112 has length 8. Both the sequence A 110 and the sequence B 112 are bi-phase valued. As used herein the term bi-phase valued means that elements of the sequence may take on only one of two possible values and the values are symmetrically distributed about 0. For example, a bi-phase valued sequence may be composed of elements valued as 1 and −1. Alternatively, a bi-phase valued sequence may be composed of elements valued as 3 and −3. The sequence A 110 is composed of sixteen ordered bi-phase values $a_1, a_2, \ldots a_{16}$. The sequence B 112 is composed of eight ordered bi-phase values $b_1, b_2, \ldots b_8$. The sequence A 110 is reproduced in Table 1 and the sequence B 112 is reproduced in Table 2 for convenient reference below. The sequence A 110 and the sequence B 112 are preferred embodiments, but the present disclosure is not limited to these values and these sequences.

convenient reference. The sequence C 120 and proportionally scaled versions of the sequence C 120 are a preferred embodiment, but the present disclosure is not limited to these values and this sequence.

TABLE 1

| Sequence A. | | | | | | | | | | | | | | | |
|---|---|---|---|---|---|---|---|---|---|---|---|---|---|---|---|
| $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ |
| 1 | 1 | 1 | −1 | 1 | 1 | 1 | −1 | 1 | −1 | 1 | 1 | −1 | 1 | −1 | −1 |

TABLE 2

| Sequence B. | | | | | | | |
|---|---|---|---|---|---|---|---|
| $b_1$ | $b_2$ | $b_3$ | $b_4$ | $b_5$ | $b_6$ | $b_7$ | $b_8$ |
| 1 | 1 | 1 | −1 | −1 | −1 | 1 | −1 |

Figure 2B:
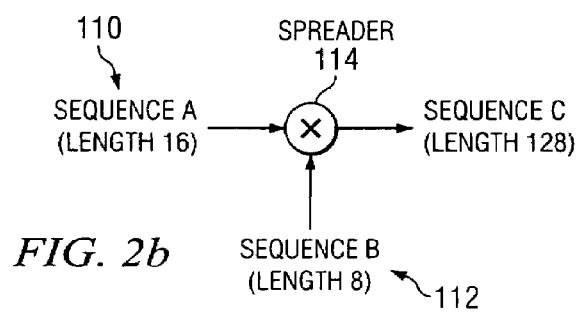
FIG. 2b illustrates a block diagram of one embodiment of a circuit for generating the 128-length sequence based on the 16-length bi-phase valued sequence and the 8-length bi-phase valued sequence.

Turning to FIG. 2b, a diagram depicts a spreader component 114 mathematically spreading the sequence A 110 with the sequence B 112 to produce a preamble sequence C having length 128. Note that the sequence A 110 and/or the sequence B 112 may be proportionally scaled by multiplying through each of the elements of sequence A 110 by the same first scaling number and/or multiplying through each of the elements of sequence B 112 by the same second scaling number. If both the sequence A 110 and the sequence B 112 are scaled, the first scaling number may be the same or different from the second scaling number. It will be appreciated by one skilled in the art that a spreader substantially similar to the spreader component 114 may be used to spread the sequence B 112 with the sequence A 110 to produce the preamble sequence C having length 128.

Turning to FIG. 3, a preamble sequence C 120 having length 128 is depicted. The preamble sequence C 120 is composed of 128 ordered bi-phase values $c_1, c_2, \ldots c_{128}$. The preamble sequence C 120 may be calculated as:

$$c_1=a_1b_1, c_2=a_1b_2, \ldots c_8=a_1b_8, c_9=a_2b_1, c_{10}=a_2b_2, \ldots$$
$$c_{16}=a_2b_8, \ldots c_{121}=a_{16}b_1, c_{122}=a_{16}b_2, \ldots$$
$$c_{128}=a_{16}b_8$$

The preamble sequence C 120 may be considered to be the matrix multiplication AB of a 16×1 matrix A (16 rows by 1 column) times a 1×8 matrix B (1 row by 8 columns). This matrix multiplication results in a 16 by 8 matrix. The 128 length sequence may be obtained by reading out the elements of the 16 by 8 matrix row-wise, one row at a time. The preamble sequence C 120 has the desired characteristics of a preamble for the fixed frequency interleaving. The preamble sequence C 120 may be scaled by a proportionality factor. For example, every element of the sequence C 120 may be multiplied by the same number to proportionally scale the preamble sequence. The preamble sequence C 120 has a zero average value. The preamble sequence C 120 autocorrelates strongly. The first side lobe of the autocorrelation of the preamble sequence C 120 is weak. The preamble sequence C 120 crosscorrelates weakly to the other TFI and FFI preambles. Additionally, the preamble sequence C 120 is a hierarchical sequence, and a receiver may identify the preamble as a fixed frequency preamble with less complexity and hence less power consumption than would be the case if the preamble sequence C 120 were not a hierarchical sequence. The preamble sequence C 120 is reproduced in Table 3 below for

TABLE 3

| Sequence C. | |
|---|---|
| Sequence Element | Value |
| $C_1$ | 1 |
| $C_2$ | 1 |
| $C_3$ | 1 |
| $C_4$ | −1 |
| $C_5$ | −1 |
| $C_6$ | −1 |
| $C_7$ | 1 |
| $C_8$ | −1 |
| $C_9$ | 1 |
| $C_{10}$ | 1 |
| $C_{11}$ | 1 |
| $C_{12}$ | −1 |
| $C_{13}$ | −1 |
| $C_{14}$ | −1 |
| $C_{15}$ | 1 |
| $C_{16}$ | −1 |
| $C_{17}$ | 1 |
| $C_{18}$ | 1 |
| $C_{19}$ | 1 |
| $C_{20}$ | −1 |
| $C_{21}$ | −1 |
| $C_{22}$ | −1 |
| $C_{23}$ | 1 |
| $C_{24}$ | −1 |
| $C_{25}$ | −1 |
| $C_{26}$ | −1 |
| $C_{27}$ | −1 |
| $C_{28}$ | 1 |
| $C_{29}$ | 1 |
| $C_{30}$ | 1 |
| $C_{31}$ | −1 |
| $C_{32}$ | 1 |
| $C_{33}$ | 1 |
| $C_{34}$ | 1 |
| $C_{35}$ | 1 |
| $C_{36}$ | −1 |
| $C_{37}$ | −1 |
| $C_{38}$ | −1 |
| $C_{39}$ | 1 |
| $C_{40}$ | −1 |
| $C_{41}$ | 1 |
| $C_{42}$ | 1 |
| $C_{43}$ | 1 |
| $C_{44}$ | −1 |
| $C_{45}$ | −1 |
| $C_{46}$ | −1 |
| $C_{47}$ | 1 |
| $C_{48}$ | −1 |
| $C_{49}$ | 1 |
| $C_{50}$ | 1 |
| $C_{51}$ | 1 |
| $C_{52}$ | −1 |
| $C_{53}$ | −1 |
| $C_{54}$ | −1 |
| $C_{55}$ | 1 |
| $C_{56}$ | −1 |
| $C_{57}$ | −1 |

TABLE 3-continued

Sequence C.

| Sequence Element | Value |
|---|---|
| $c_{58}$ | −1 |
| $c_{59}$ | −1 |
| $c_{60}$ | 1 |
| $c_{61}$ | 1 |
| $c_{62}$ | 1 |
| $c_{63}$ | −1 |
| $c_{64}$ | 1 |
| $c_{65}$ | 1 |
| $c_{66}$ | 1 |
| $c_{67}$ | 1 |
| $c_{68}$ | −1 |
| $c_{69}$ | −1 |
| $c_{70}$ | −1 |
| $c_{71}$ | 1 |
| $c_{72}$ | −1 |
| $c_{73}$ | −1 |
| $c_{74}$ | −1 |
| $c_{75}$ | −1 |
| $c_{76}$ | 1 |
| $c_{77}$ | 1 |
| $c_{78}$ | 1 |
| $c_{79}$ | −1 |
| $c_{80}$ | 1 |
| $c_{81}$ | 1 |
| $c_{82}$ | 1 |
| $c_{83}$ | 1 |
| $c_{84}$ | −1 |
| $c_{85}$ | −1 |
| $c_{86}$ | −1 |
| $c_{87}$ | 1 |
| $c_{88}$ | −1 |
| $c_{89}$ | 1 |
| $c_{90}$ | 1 |
| $c_{91}$ | 1 |
| $c_{92}$ | −1 |
| $c_{93}$ | −1 |
| $c_{94}$ | −1 |
| $c_{95}$ | 1 |
| $c_{96}$ | −1 |
| $c_{97}$ | −1 |
| $c_{98}$ | −1 |
| $c_{99}$ | −1 |
| $c_{100}$ | 1 |
| $c_{101}$ | 1 |
| $c_{102}$ | 1 |
| $c_{103}$ | −1 |
| $c_{104}$ | 1 |
| $c_{105}$ | 1 |
| $c_{106}$ | 1 |
| $c_{107}$ | 1 |
| $c_{108}$ | −1 |
| $c_{109}$ | −1 |
| $c_{110}$ | −1 |
| $c_{111}$ | 1 |
| $c_{112}$ | −1 |
| $c_{113}$ | −1 |
| $c_{114}$ | −1 |
| $c_{115}$ | −1 |
| $c_{116}$ | 1 |
| $c_{117}$ | 1 |
| $c_{118}$ | 1 |
| $c_{119}$ | −1 |
| $c_{120}$ | 1 |
| $c_{121}$ | −1 |
| $c_{122}$ | −1 |
| $c_{123}$ | −1 |
| $c_{124}$ | 1 |
| $c_{125}$ | 1 |
| $c_{126}$ | 1 |
| $c_{127}$ | −1 |
| $c_{128}$ | 1 |

When transmitting the preamble sequence C 120, the power spectrum density on the band may be less than the maximum allowable. It is preferred to transmit at maximum power, as this may improve the signal to noise ratio (SNR) experienced by the receiver and hence improve reception of the preamble at the receiver. By transforming the preamble sequence C 120 into the frequency domain, modifying the amplitude function of the preamble sequence C 120 in the frequency domain to achieve maximum power spectrum density, and transforming the modified sequence back to the time domain, a spectrally flattened preamble sequence may be defined.

Figure 4A:
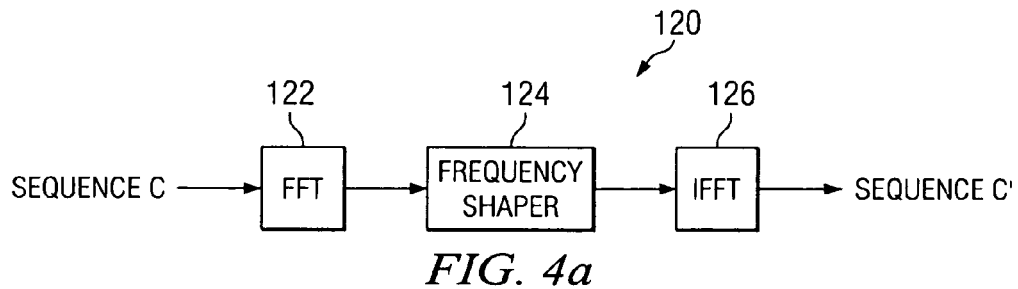
FIG. 4 illustrates a first 128-length spectrally flattened preamble sequence, based on the first 128-length sequence, according to one embodiment.

Turning to FIG. 4*a*, a portion of a transmitter circuit 120 for adjusting the spectral characteristics of the preamble sequence C 120 is depicted. The preamble sequence C 120 may be passed through a fast Fourier transformer component 122 to produce a frequency domain representation, spectrally reshaping the frequency domain representation in a frequency shaper component 124, and passing the reshaped frequency domain representation through an inverse fast Fourier transformer component 126 to produce a time domain spectrally adjusted preamble sequence C'. The shaping of the amplitude function of the preamble sequence C 120 in the frequency domain, which may be termed adjusting the spectral characteristics of the sequence, does not alter the phase function of the preamble sequence C 120 in the frequency domain. The preamble sequence C 120 may also be modified in a similar manner to provide other arbitrary shapes to provide some desired frequency characteristic. For example, notches may be introduced in the frequency spectrum to protect services. A transmitter device may adjust the spectral characteristics of the preamble in response to changing wireless communication channel conditions. This may be termed adjusting spectral characteristics on the fly. Note that the notch location or locations may be changed over time.

Turning to FIG. 4*b*, a spectrally flattened preamble sequence C' 130 having length 128 is depicted. The spectrally flattened preamble sequence C' 130 is composed of the ordered sequence of values $c'_1, c'_2, \ldots c'_{128}$. The spectrally flattened preamble sequence C' 130 is reproduced in Table 4 below for convenient reference. The sequence C' and proportionally scaled versions of the sequence C' are a preferred embodiment, but the present disclosure is not limited to these values and this sequence.

TABLE 4

Spectrally Flattened Preamble Sequence C'.

| Sequence Element | Value |
|---|---|
| $c'_1$ | 0.9574 |
| $c'_2$ | 0.5270 |
| $c'_3$ | 1.5929 |
| $c'_4$ | −0.2500 |
| $c'_5$ | −0.2536 |
| $c'_6$ | −0.3023 |
| $c'_7$ | 1.2907 |
| $c'_8$ | −0.4258 |
| $c'_9$ | 1.0012 |
| $c'_{10}$ | 1.7704 |
| $c'_{11}$ | 0.8593 |
| $c'_{12}$ | −0.3719 |
| $c'_{13}$ | −1.3465 |
| $c'_{14}$ | −0.7419 |
| $c'_{15}$ | 1.5350 |
| $c'_{16}$ | −1.2180 |
| $c'_{17}$ | 0.6955 |
| $c'_{18}$ | 1.7204 |
| $c'_{19}$ | 0.1643 |
| $c'_{20}$ | −0.3347 |
| $c'_{21}$ | −1.7244 |

TABLE 4-continued

Spectrally Flattened Preamble Sequence C'.

| Sequence Element | Value |
|---|---|
| $C'_{22}$ | −0.7447 |
| $C'_{23}$ | 1.1141 |
| $C'_{24}$ | −1.3541 |
| $C'_{25}$ | −0.7293 |
| $C'_{26}$ | 0.2682 |
| $C'_{27}$ | −1.2401 |
| $C'_{28}$ | 1.0527 |
| $C'_{29}$ | 0.1199 |
| $C'_{30}$ | 1.1496 |
| $C'_{31}$ | −1.0544 |
| $C'_{32}$ | 1.3176 |
| $C'_{33}$ | 0.8400 |
| $C'_{34}$ | 1.3980 |
| $C'_{35}$ | 1.1147 |
| $C'_{36}$ | −0.4732 |
| $C'_{37}$ | −1.7178 |
| $C'_{38}$ | −0.8477 |
| $C'_{39}$ | 1.5083 |
| $C'_{40}$ | −1.4364 |
| $C'_{41}$ | 0.3853 |
| $C'_{42}$ | 1.5673 |
| $C'_{43}$ | 0.0295 |
| $C'_{44}$ | −0.4204 |
| $C'_{45}$ | −1.4856 |
| $C'_{46}$ | −0.8404 |
| $C'_{47}$ | 1.0111 |
| $C'_{48}$ | −1.4269 |
| $C'_{49}$ | 0.3033 |
| $C'_{50}$ | 0.7757 |
| $C'_{51}$ | −0.1370 |
| $C'_{52}$ | −0.5250 |
| $C'_{53}$ | −1.1589 |
| $C'_{54}$ | −0.8324 |
| $C'_{55}$ | 0.6336 |
| $C'_{56}$ | −1.2698 |
| $C'_{57}$ | −0.7853 |
| $C'_{58}$ | −0.7031 |
| $C'_{59}$ | −1.1106 |
| $C'_{60}$ | 0.6071 |
| $C'_{61}$ | 0.7164 |
| $C'_{62}$ | 0.8305 |
| $C'_{63}$ | −1.2355 |
| $C'_{64}$ | 1.1754 |
| $C'_{65}$ | 0.5859 |
| $C'_{66}$ | 0.3053 |
| $C'_{67}$ | 0.2408 |
| $C'_{68}$ | −0.6744 |
| $C'_{69}$ | −0.2361 |
| $C'_{70}$ | −0.8133 |
| $C'_{71}$ | 0.9201 |
| $C'_{72}$ | −1.0841 |
| $C'_{73}$ | −0.8036 |
| $C'_{74}$ | −0.3105 |
| $C'_{75}$ | −1.0514 |
| $C'_{76}$ | 0.7644 |
| $C'_{77}$ | 0.7301 |
| $C'_{78}$ | 0.9788 |
| $C'_{79}$ | −1.1305 |
| $C'_{80}$ | 1.3257 |
| $C'_{81}$ | 0.7801 |
| $C'_{82}$ | 0.7867 |
| $C'_{83}$ | 1.0996 |
| $C'_{84}$ | −0.5623 |
| $C'_{85}$ | −1.2227 |
| $C'_{86}$ | −0.8223 |
| $C'_{87}$ | 1.2074 |
| $C'_{88}$ | −1.2338 |
| $C'_{89}$ | 0.2957 |
| $C'_{90}$ | 1.0999 |
| $C'_{91}$ | −0.0201 |
| $C'_{92}$ | −0.5194 |
| $C'_{93}$ | −1.2284 |
| $C'_{94}$ | −0.9215 |
| $C'_{95}$ | 0.7941 |
| $C'_{96}$ | −1.4128 |
| $C'_{97}$ | −0.8528 |
| $C'_{98}$ | −0.6973 |
| $C'_{99}$ | −1.2477 |
| $C'_{100}$ | 0.6246 |
| $C'_{101}$ | 0.7687 |
| $C'_{102}$ | 0.7966 |
| $C'_{103}$ | −1.2809 |
| $C'_{104}$ | 1.1023 |
| $C'_{105}$ | 0.4250 |
| $C'_{106}$ | −0.1614 |
| $C'_{107}$ | 0.7547 |
| $C'_{108}$ | −0.6696 |
| $C'_{109}$ | −0.3920 |
| $C'_{110}$ | −0.7589 |
| $C'_{111}$ | 0.6701 |
| $C'_{112}$ | −0.9381 |
| $C'_{113}$ | −0.7483 |
| $C'_{114}$ | −0.9659 |
| $C'_{115}$ | −0.9192 |
| $C'_{116}$ | 0.3925 |
| $C'_{117}$ | 1.2864 |
| $C'_{118}$ | 0.6784 |
| $C'_{119}$ | −1.0909 |
| $C'_{120}$ | 1.1140 |
| $C'_{121}$ | −0.6134 |
| $C'_{122}$ | −1.5467 |
| $C'_{123}$ | −0.3031 |
| $C'_{124}$ | 0.9457 |
| $C'_{125}$ | 1.9645 |
| $C'_{126}$ | 1.4549 |
| $C'_{127}$ | −1.2760 |
| $C'_{128}$ | 2.2102 |

The spectrally flattened preamble sequence C' 130 defined above may be stored in memory and read back from memory when transmitting, or the spectrally flattened sequence C' 130 may be calculated at transmission time.

Figure 5A:
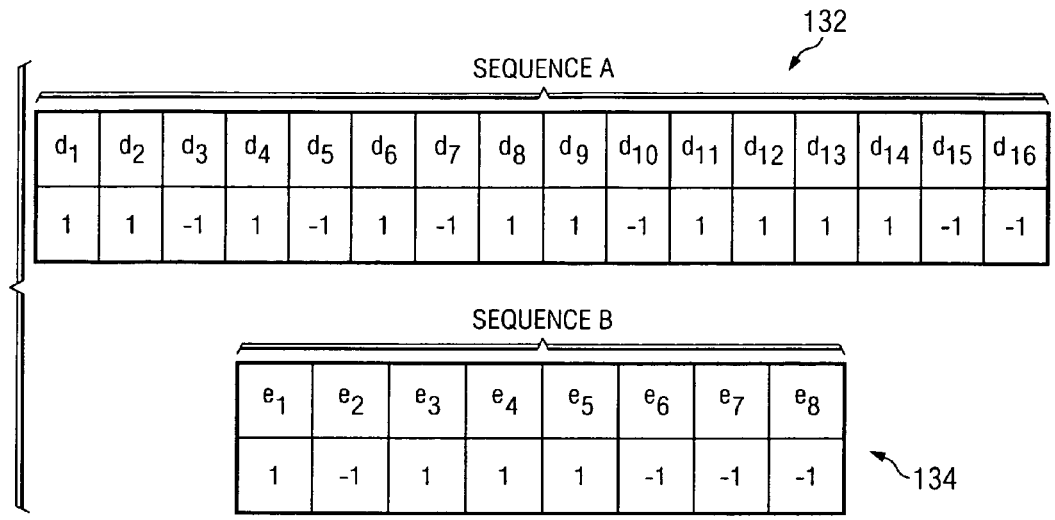
FIG. 5a illustrates a second 16-length bi-phase valued sequence and a second 8-length bi-phase valued sequence for generating a second 128-length sequence according to one embodiment of the present disclosure.

Turning now to FIG. 5*a*, two additional numerical sequences suitable for spreading to produce a preamble sequence having length 128 are depicted. A sequence D 132 has length 16, and a sequence E 134 has length 8. Note that both the sequence D 132 and the sequence E 134 may be proportionally scaled as described above with reference to the sequence A 110 and the sequence B 112. Turning now to FIG. 5*b*, a preamble sequence F 136 having length 128 is depicted. Note that the preamble sequence F 136 may be proportionally scaled. The preamble sequence F 136 may be generated by spreading the sequence D 132 with the sequence E 134 or by spreading the sequence E 134 with the sequence D 132. The preamble sequence F 136 is a hierarchical sequence, has a zero average value, autocorrelates strongly, exhibits a weak first side lobe of the autocorrelation, and crosscorrelates weakly to other TFI and FFI preambles.

Turning now to FIG. 5*c*, a spectrally flattened preamble sequence F' 138, based on the sequence F 136, is depicted. Note that the spectrally flattened preamble sequence F' 138 may be proportionally scaled.

Figure 6A:
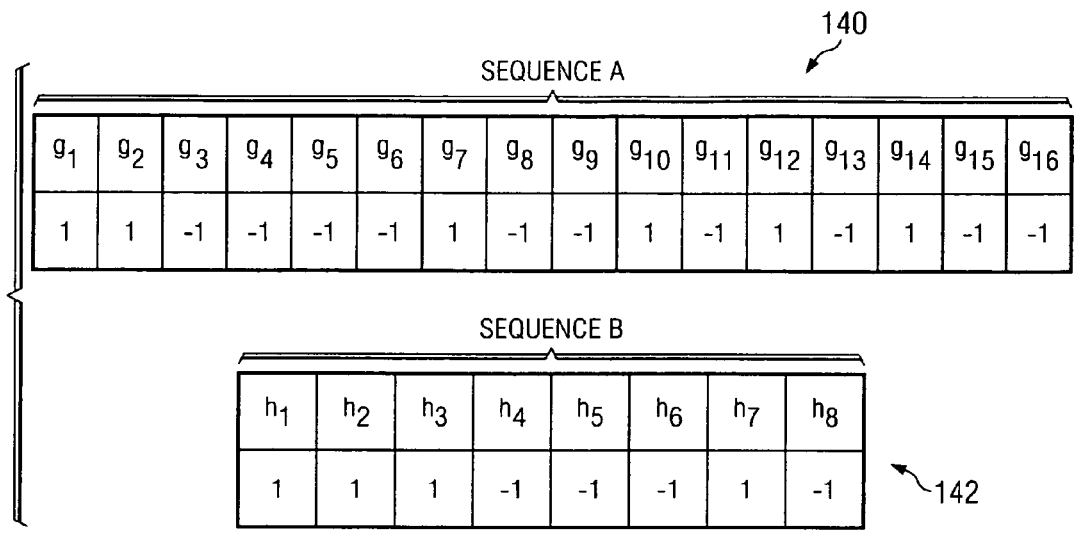
FIG. 6a illustrates a third 16-length bi-phase valued sequence and a third 8-length bi-phase valued sequence for generating a third 128-length sequence according to one embodiment of the present disclosure.

Turning now to FIG. 6*a*, two additional numerical sequences suitable for spreading to produce a preamble sequence having length 128 are depicted. A sequence G 140 has length 16, and a sequence H 142 has length 8. Note that the sequence G 140 and the sequence H 142 may be proportionally scaled as described above with reference to the sequence A 110 and the sequence B 112. Turning now to FIG. 6*b*, a preamble sequence J 144 having length 128 is depicted.

Note that the preamble sequence J 144 may be proportionally scaled. The preamble sequence J 144 may be generated by spreading the sequence G 140 with the sequence H 142 or by spreading the sequence H 142 with the sequence G 140. The preamble sequence J 144 is a hierarchical sequence, has a zero average value, autocorrelates strongly, exhibits a weak first side lobe of the autocorrelation, and crosscorrelates weakly to other TFI and FFI preambles.

Turning now to FIG. 6c, a spectrally flattened preamble sequence J' 146, based on the sequence J 144, is depicted. Note that the spectrally flattened preamble sequence J' 144 may be proportionally scaled.

The three 128 length preamble sequences defined above, the preamble sequence C 126, the preamble sequence F 136, and the preamble sequence J 144, are suitable for use as three unique preamble sequences to differentiate between each of the three frequency bands of a band group in FFI piconets. The three 128 length spectrally flattened preamble sequences defined above, the spectrally flattened preamble sequence C' 130, the spectrally flattened preamble sequence F' 138, and the spectrally flattened preamble sequence J' 146 are suitable for use as three unique spectrally flattened preamble sequences to differentiate between each of the three frequency bands of a band group in FFI piconets. In an embodiment, two FFI preambles and one spectrally flattened FFI preamble may be used in a network. In an embodiment, one FFI preamble and two spectrally flattened FFI preambles may be used in a network.

Figure 7A:
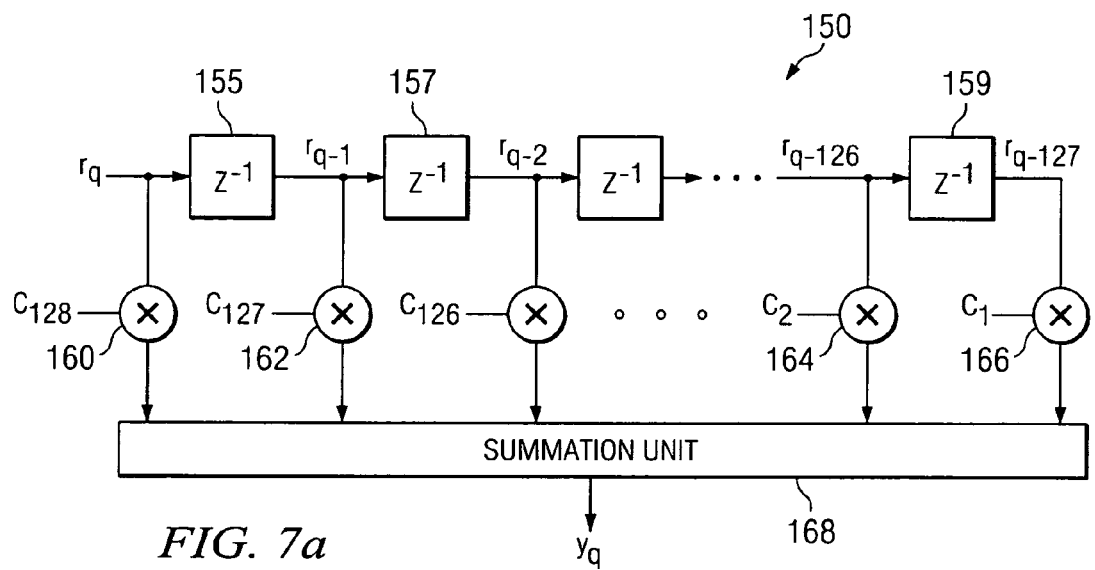
FIG. 7a is a block diagram of a one-step 128-length despreader according to one embodiment of the present disclosure.

Turning now to FIG. 7a, a block diagram is provided that illustrates a despreader 150 for use in extracting a spreading sequence from a received signal. The despreader 150 may also be used to detect a particular preamble sequence within a sequence of received samples. The samples may be generated by periodically sampling and digitizing a received signal, for example a radio transmission in a piconet. The despreader 150 performs the despreading with the entire spreading sequence at one time, for example, the despreader 150 would despread received data that was originally spread with a spreading sequence of length 128 with the 128-length sequence. The spreading sequence is the fixed frequency interleaved preamble. As displayed in FIG. 5a, the despreader 150 can be implemented as a tapped delay line. Tapped delay lines are considered to be well understood by those of ordinary skill in the art and for this reason will not be discussed in detail herein.

According to the preferred embodiment, the despreader 150 may be described where $r_q$ denotes the q-th symbol of the received signal, $y_q$ denotes the q-th symbol of the despread data, and $c_j$ denotes the j-th value of the fixed frequency interleaving preamble. $c_j$ may also be referred to as the j-th coefficient of the spreading sequence. The received signal may be provided to a linear array of delay elements, for example, delay element 155 and 157. Note that the linear array of delay elements may be referred to as a tapped delay line. The delay elements may have a unity delay. Therefore, if $r_q$ is the input to the delay element 155, then $r_{q-1}$ is the output of the delay element 155 while $r_{q-2}$ is the output of the delay element 157. If the spreading sequence is of length k, then there are k–1 delay elements in the tapped delay line. In addition to having an output coupled to the following delay element, the output of each delay element may also be coupled to a multiplier. For example, delay element 155 may have its output coupled to delay element 157 as well as multiplier 162. Note that an additional multiplier, multiplier 160, may have as its input the received signal $r_k$.

Each multiplier has as a second input a coefficient of the spreading sequence, with a multiplier coupled to a first delay element in the tapped delay line having the last coefficient of the spreading sequence ($c_k$). The second input to each of the subsequent multipliers are the remaining coefficients of the spreading sequence. For example, with the 128-length spreading sequence, then the second input to the multiplier 160 would be $c_{128}$ and for multiplier 162, it would be $c_{127}$. Output from each of the multipliers can then be provided to a summation unit 168 that can combine the outputs together to produce the despread data.

Figure 7B:
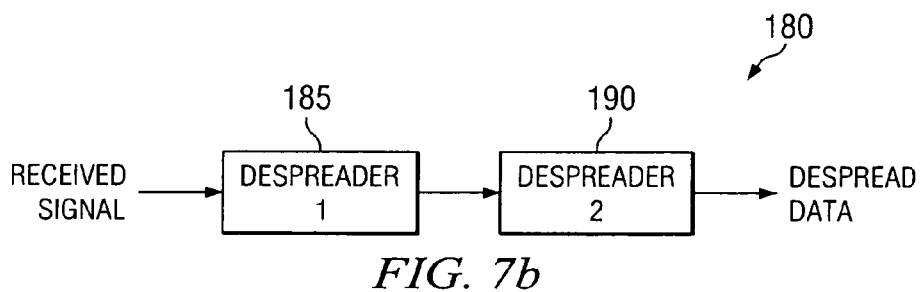
FIG. 7b is a block diagram of a two stage despreader according to another embodiment.

FIG. 7b illustrates a high-level view of a two-stage despreader 180 for use in detecting a hierarchical spreading sequence in the received signal, according to a preferred embodiment of the present invention. The two-stage despreader 180 may also be used to detect a sequence in a preamble. When a hierarchical sequence is used as a spreading sequence, the despreading of the received signal may also be performed using a despreader similar to the despreader 150 (FIG. 5a) wherein the despreading is performed in a single step with the full spreading sequence. However, as discussed above, the single step despreading may lead to a complex despreader that may consume a large amount of power. Therefore, when a hierarchical spreading sequence is used, the despreading can occur as a two-step operation. The resulting despreader may use fewer logic gates and therefore use less power.

The received signal may first be provided to a first despreader 185, which can perform a despreading operation with a second sequence, wherein the hierarchical spreading sequence may be the result of the first sequence being spread with a second sequence. Note that if the first sequence is of length M and the second sequence is of length N, then the hierarchical spreading sequence is of length M*N. After being despread with the second sequence in the first despreader 185, the output of the first despreader 185 may then be provided to a second despreader 190, which can perform a despreading on the output of the first despreader 185 with the first sequence. Note that the second despreader 190 should despread every N-th output of the first despreader.

According to a preferred embodiment of the present invention, the order of the despreading can be independent of the order of the spreading. If the first despreader 185 were to despread the received signal with the first sequence (the M-length sequence), then the first despreader 185 should despread every N-th received sample. The output of the first despreader 185 may then be provided to the second despreader 190, which can despread every output of the first despreader 185 with the second sequence (the N-length sequence).

Figure 7C:
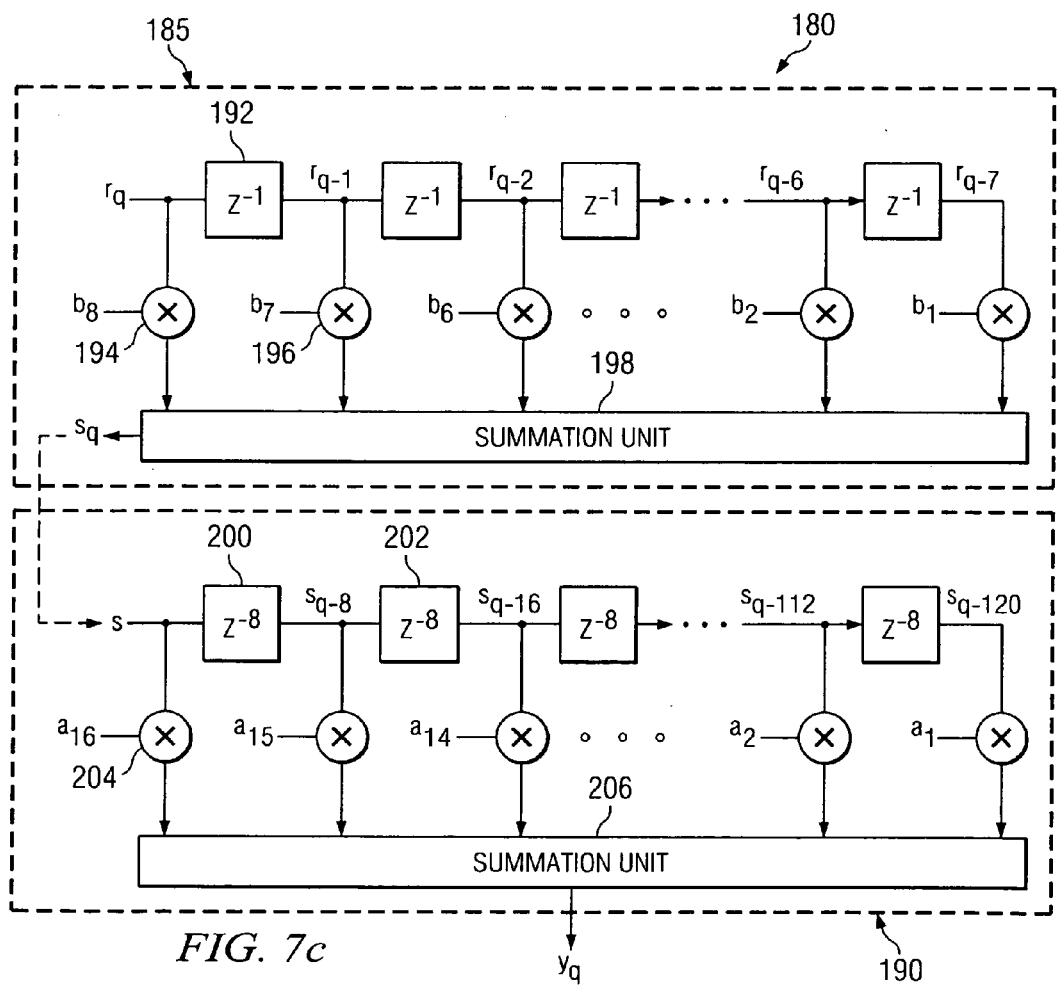
FIG. 7c is a block diagram of a two stage despreader, having a first stage using an 8-length despreader and a second stage using a 16-length despreader, according to another embodiment of the present disclosure.

FIG. 7c illustrates a detailed view of the two-stage despreader 180 for use in removing a hierarchical spreading sequence from a received signal, according to a preferred embodiment of the present invention. As shown in FIG. 5c, the first despreader 185 will despread with the N-length spreading sequence and the second despreader 190 will despread with the M-length spreading sequence.

The design of the first and the second despreaders 185 and 190 uses the tapped delay line structure of the despreader 150 (FIG. 5a), with differences mainly in the coefficients, the value of the delay elements, and the input signals. Since the first despreader 185 despreads the received signal with the N-length spreading sequence, the received signal, $r_q$, can be the input to the first despreader 185 at the tapped delay line. As in the despreader 150, the number of delay elements should be one less than the length of the spreading sequence (N). According to a preferred embodiment of the present invention, each of the delay elements (for example, delay element 192) may have a unity delay. Coupled to each of the delay elements is a multiplier that can be used to multiply the output of the delay element with a coefficient of the spreading sequence, with an additional multiplier being coupled to the received signal, $r_q$. For example, a multiplier 194 multiplies the received signal, $r_q$, with an eighth coefficient of the N-length spreading sequence, while a multiplier 196 multiplies the output of delay element 192 with a seventh coefficient of the N-length spreading sequence. A summation unit 198 combines the outputs of the multipliers to form an intermediate signal, $s_q$.

The second despreader 190, which despreads every N-th output produced by the first despreader 185, has a design that differs slightly from the design of the first despreader 185. The second despreader 190 also makes use of a tapped delay line, but rather than the delay elements having unity delay, the delay elements (such as delay elements 200 and 202) have delays that can be equal to the length of the spreading sequence used in the first despreader 185, which in this discussion, is N=8. The number of delay elements in the tapped delay line is one less than the length of the spreading sequence (M) while the number of multipliers (such as multiplier 204) is equal to the length of the spreading sequence (M). As in the first despreader 185, the multipliers multiply the outputs of the delay elements with the coefficients of the spreading sequence. For example, the multiplier 204 multiplies the intermediate signal, $s_q$, with a sixteenth coefficient of the spreading sequence. A summation unit 206 combines the outputs of the multipliers to produce the despread data, $y_q$.

Figure 7D:
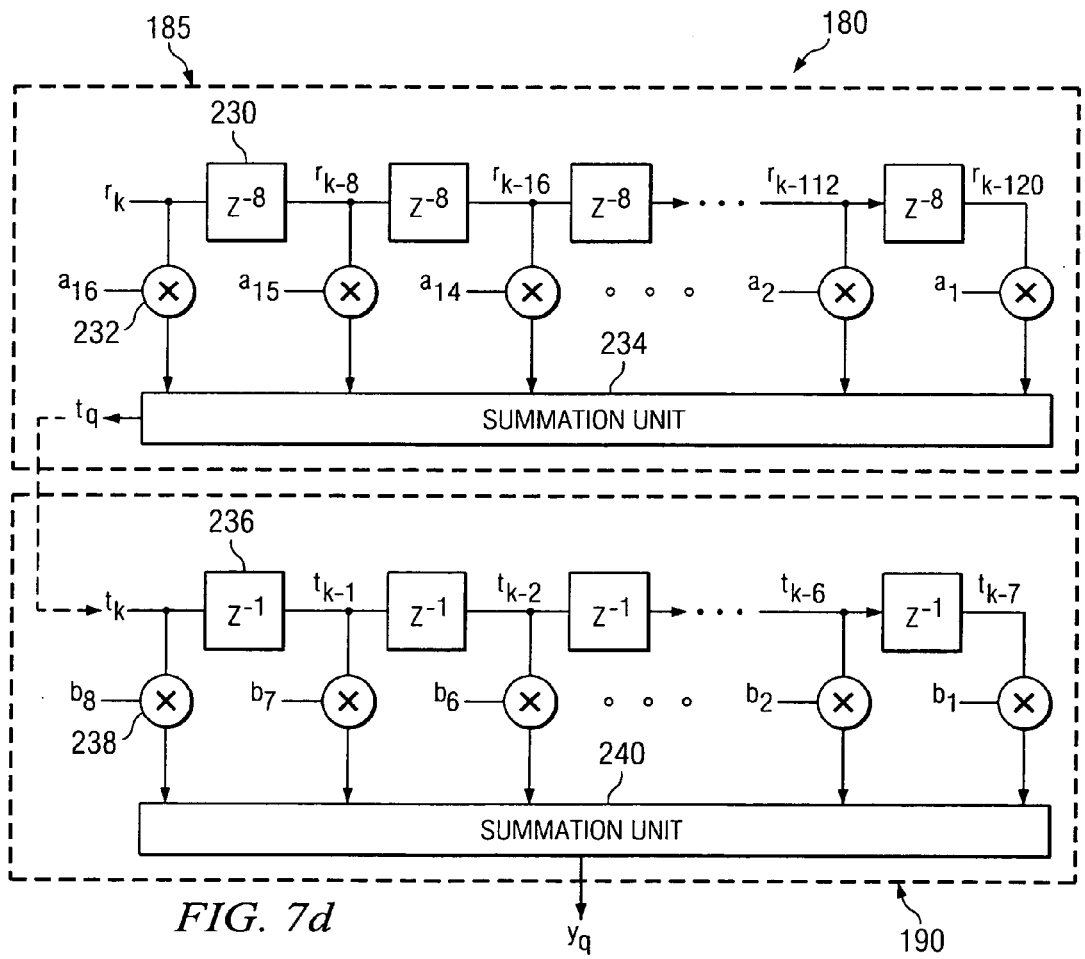
FIG. 7d is a block diagram of another embodiment of a two stage despreader, having a first stage using a 16-length despreader and a second stage using an 8-length despreader.

FIG. 7d illustrates a detailed view of another embodiment of the two-stage despreader 180 for use in extracting a hierarchical spreading sequence from a received signal, according to a preferred embodiment of the present invention. As shown in FIG. 5d, the first despreader 185 will despread with the M-length spreading sequence and the second despreader 190 will despread with the N-length spreading sequence.

Since the received signal may have been originally an M-length sequence that was spread with an N-length sequence, the first despreader 185 may be configured to despread every N-th received sample. This may be accomplished by using a tapped delay line with delay elements, such as delay element 230, having a delay equal to N=8. Multipliers, such as multiplier 232 can multiply the outputs of the delay elements (or in the case of the multiplier 232, the received signal) with coefficients of the M-length spreading sequence. A summation unit 234 can combine the outputs of the multipliers to produce an intermediate value, $t_q$.

The second despreader 190 may have a more conventional design, wherein its tapped delay line may have delay elements, such as delay element 236, with unity delay. Again, multipliers, such as multiplier 238 can multiply the outputs of the delay elements (or in the case of the multiplier 238, the intermediate signal) with the coefficients of the N-length spreading sequence. A summation unit 240 can combine the outputs of the multipliers to produce the despread data, $y_k$.

The spreader component 114, the single stage despreader 150, and the two stage despreader 180 described above are functional blocks that may be implemented as software which is executed on a general purpose central processing unit. Alternatively, the spreader component 114, the single stage despreader 150, and the two stage despreader 180 may be realized in integrated circuits, for example application specific integrated circuits (ASICs), field programmable gate arrays (FPGAs), complex programmable logic devices (CPLDs), portions of digital signal processors, portions of microprocessors, portions of microcontrollers, or other special purpose circuit realizations known to those skilled in the art. The spreader component 114, the single stage despreader 150, and the two stage despreader 180 may be combined with one or more of the other components as a "system on a chip" including the antennas 14, 16 and other typical components of a communication transmitter/receiver.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A circuit for a wireless receiver to despread a 128-length hierarchical sequence, the circuit comprising:
   a first despreader operable using one of a 16-length sequence and an 8-length sequence to despread a received signal, the received signal defined as a fixed frequency interleaved transmission having one of a first preamble, a second preamble, and a third preamble, the 16-length sequence selected from a group consisting of, for the received signal containing the first preamble, a first 16-length sequence proportional to

| $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ |
|---|---|---|---|---|---|---|---|---|---|---|---|---|---|---|---|
| 1 | 1 | 1 | -1 | 1 | 1 | 1 | -1 | 1 | -1 | 1 | 1 | -1 | 1 | -1 | -1 | and, for the received signal containing the second preamble, a second 16-length sequence proportional to

| $d_1$ | $d_2$ | $d_3$ | $d_4$ | $d_5$ | $d_6$ | $d_7$ | $d_8$ | $d_9$ | $d_{10}$ | $d_{11}$ | $d_{12}$ | $d_{13}$ | $d_{14}$ | $d_{15}$ | $d_{16}$ |
|---|---|---|---|---|---|---|---|---|---|---|---|---|---|---|---|
| 1 | 1 | −1 | 1 | −1 | 1 | −1 | 1 | 1 | −1 | 1 | 1 | 1 | 1 | −1 | −1 | and, for the received signal containing the third preamble, a third 16-length sequence proportional to

| $g_1$ | $g_2$ | $g_3$ | $g_4$ | $g_5$ | $g_6$ | $g_7$ | $g_8$ | $g_9$ | $g_{10}$ | $g_{11}$ | $g_{12}$ | $g_{13}$ | $g_{14}$ | $g_{15}$ | $g_{16}$ |
|---|---|---|---|---|---|---|---|---|---|---|---|---|---|---|---|
| 1 | 1 | −1 | −1 | −1 | −1 | 1 | −1 | −1 | 1 | −1 | 1 | −1 | 1 | −1 | −1 | and, wherein the 8-length sequence selected from a group consisting of, for the received signal containing the first preamble, a first 8-length sequence proportional to

| $b_1$ | $b_2$ | $b_3$ | $b_4$ | $b_5$ | $b_6$ | $b_7$ | $b_8$ |
|---|---|---|---|---|---|---|---|
| 1 | 1 | 1 | −1 | −1 | −1 | 1 | −1 | and, for the received signal containing the second preamble, a second 8-length sequence proportional to

| $e_1$ | $e_2$ | $e_3$ | $e_4$ | $e_5$ | $e_6$ | $e_7$ | $e_8$ |
|---|---|---|---|---|---|---|---|
| 1 | −1 | 1 | 1 | 1 | −1 | −1 | −1 | and, for the received signal containing the second preamble, a second 8-length sequence proportional to

| $h_1$ | $h_2$ | $h_3$ | $h_4$ | $h_5$ | $h_6$ | $h_7$ | $h_8$ |
|---|---|---|---|---|---|---|---|
| 1 | 1 | 1 | −1 | −1 | −1 | 1 | −1 | a second despreader using the other of the 16-length sequence and the 8-length sequence to despread the output of the first despreader to form the 128-length hierarchical sequence.

2. The circuit of claim 1, wherein the first and second despreader comprise:

a serially coupled chain of delay elements, a first delay element is coupled to an input;
a plurality of multipliers, each multiplier having a first input coupled to an output of one delay element and a second input coupled to a coefficient of a sequence, the sequence for the first despreader is the first sequence and the sequence for the second despreader is the second sequence; and
a summation unit coupled to outputs of each multiplier, the summation unit to combine the outputs of each multiplier to produce a value, wherein the first despreader has 7 delay elements and 8 multipliers, the second despreader has 15 delay elements and 16 multipliers, the first sequence is the 8-length sequence, and the second sequence is the 16-length sequence.

3. The circuit of claim 1, wherein the first and second despreader comprise:

a serially coupled chain of delay elements, a first delay element is coupled to an input;
a plurality of multipliers, each multiplier having a first input coupled to an output of one delay element and a second input coupled to a coefficient of a sequence, the sequence for the first despreader is the first sequence and the sequence for the second despreader is the second sequence; and
a summation unit coupled to outputs of each multiplier, the summation unit to combine the outputs of each multiplier to produce a value, wherein the first despreader has 15 delay elements and 16 multipliers, the second despreader has 7 delay elements and 8 multipliers, the first sequence is the 16-length sequence, and the second sequence is the 8-length sequence.

4. The circuit of claim 1, wherein the fixed frequency interleaved transmission includes a preamble that makes use of the hierarchical sequence and wherein the fixed frequency interleaved transmission is in a piconet.

5. The circuit of claim 1, wherein the wireless receiver is operable to receive wireless communications compliant with a multi-band orthogonal frequency division modulated alliance special interest group physical layer specification.

6. A wireless device that distinguishes between multiple piconets, the wireless device comprising:

a preamble component operable to provide a preamble for a wireless fixed frequency interleaving transmission; and
a correlator component operable to distinguish a wireless transmission based on the preamble, wherein the preamble is based on a 128-length sequence is equivalent to a 16-length sequence spread with a 8-length sequence, wherein the 16-length sequence is selected from the group consisting of a first 16-length sequence, a second 16-length sequence, and a third 16-length sequence and the 8-length sequence is selected from the group consisting of a first 8-length sequence, a second 8-length sequence, and a third 8-length sequence.

7. The wireless device of claim 6, wherein the correlator component further includes a 128-length despreader operable to determine a correlation between the 128-length sequence and the wireless transmission.

8. The wireless device of claim 6, wherein the wireless device receives a first wireless transmission and a second wireless transmission and the correlator component is operable to calculate a first correlation of the preamble aligned with at least a portion of the first wireless transmission and a second correlation of the preamble aligned with at least a portion of the second wireless transmission, the one of the correlations having a greater value identified as associated with the wireless device.

9. The wireless device of claim 6, wherein the preamble component reads the preamble out of a memory area and the preamble is formed by transforming the 128-length sequence to form a spectrally flattened 128-length sequence, wherein the 128-length sequence is selected from the group of sequences consisting of a first 128-length sequence, a second 128-length sequence, and a third 128-length sequence, by adaptive spectral shaping, which includes enhancing spectral energy density of the preamble, the first 128-length sequence, formed using the first 16-length sequence and the first 8-length sequence, proportional to:

| Sequence Element | Value |
|---|---|
| $C_1$ | 1 |
| $C_2$ | 1 |
| $C_3$ | 1 |
| $C_4$ | -1 |
| $C_5$ | -1 |
| $C_6$ | -1 |
| $C_7$ | 1 |
| $C_8$ | -1 |
| $C_9$ | 1 |
| $C_{10}$ | 1 |
| $C_{11}$ | 1 |
| $C_{12}$ | -1 |
| $C_{13}$ | -1 |
| $C_{14}$ | -1 |
| $C_{15}$ | 1 |
| $C_{16}$ | -1 |
| $C_{17}$ | 1 |
| $C_{18}$ | 1 |
| $C_{19}$ | 1 |
| $C_{20}$ | -1 |
| $C_{21}$ | -1 |
| $C_{22}$ | -1 |
| $C_{23}$ | 1 |
| $C_{24}$ | -1 |
| $C_{25}$ | -1 |
| $C_{26}$ | -1 |
| $C_{27}$ | -1 |
| $C_{28}$ | 1 |
| $C_{29}$ | 1 |
| $C_{30}$ | 1 |
| $C_{31}$ | -1 |
| $C_{32}$ | 1 |
| $C_{33}$ | 1 |
| $C_{34}$ | 1 |
| $C_{35}$ | 1 |
| $C_{36}$ | -1 |
| $C_{37}$ | -1 |
| $C_{38}$ | -1 |
| $C_{39}$ | 1 |
| $C_{40}$ | -1 |
| $C_{41}$ | 1 |
| $C_{42}$ | 1 |
| $C_{43}$ | 1 |
| $C_{44}$ | -1 |
| $C_{45}$ | -1 |
| $C_{46}$ | -1 |
| $C_{47}$ | 1 |
| $C_{48}$ | -1 |
| $C_{49}$ | 1 |
| $C_{50}$ | 1 |
| $C_{51}$ | 1 |
| $C_{52}$ | -1 |
| $C_{53}$ | -1 |
| $C_{54}$ | -1 |
| $C_{55}$ | 1 |
| $C_{56}$ | -1 |
| $C_{57}$ | -1 |
| $C_{58}$ | -1 |
| $C_{59}$ | -1 |
| $C_{60}$ | 1 |
| $C_{61}$ | 1 |
| $C_{62}$ | 1 |
| $C_{63}$ | -1 |
| $C_{64}$ | 1 |
| $C_{65}$ | 1 |
| $C_{66}$ | 1 |
| $C_{67}$ | 1 |
| $C_{68}$ | -1 |
| $C_{69}$ | -1 |
| $C_{70}$ | -1 |
| $C_{71}$ | 1 |
| $C_{72}$ | -1 |
| $C_{73}$ | -1 |
| $C_{74}$ | -1 |
| $C_{75}$ | -1 |
| $C_{76}$ | 1 |
| $C_{77}$ | 1 |
| $C_{78}$ | 1 |
| $C_{79}$ | -1 |
| $C_{80}$ | 1 |
| $C_{81}$ | 1 |
| $C_{82}$ | 1 |
| $C_{83}$ | 1 |
| $C_{84}$ | -1 |
| $C_{85}$ | -1 |
| $C_{86}$ | -1 |
| $C_{87}$ | 1 |
| $C_{88}$ | -1 |
| $C_{89}$ | 1 |
| $C_{90}$ | 1 |
| $C_{91}$ | 1 |
| $C_{92}$ | -1 |
| $C_{93}$ | -1 |
| $C_{94}$ | -1 |
| $C_{95}$ | 1 |
| $C_{96}$ | -1 |
| $C_{97}$ | -1 |
| $C_{98}$ | -1 |
| $C_{99}$ | -1 |
| $C_{100}$ | 1 |
| $C_{101}$ | 1 |
| $C_{102}$ | 1 |
| $C_{103}$ | -1 |
| $C_{104}$ | 1 |
| $C_{105}$ | 1 |
| $C_{106}$ | 1 |
| $C_{107}$ | 1 |
| $C_{108}$ | -1 |
| $C_{109}$ | -1 |
| $C_{110}$ | -1 |
| $C_{111}$ | 1 |
| $C_{112}$ | -1 |
| $C_{113}$ | -1 |
| $C_{114}$ | -1 |
| $C_{115}$ | -1 |
| $C_{116}$ | 1 |
| $C_{117}$ | 1 |
| $C_{118}$ | 1 |
| $C_{119}$ | -1 |
| $C_{120}$ | 1 |
| $C_{121}$ | -1 |
| $C_{122}$ | -1 |
| $C_{123}$ | -1 |
| $C_{124}$ | 1 |
| $C_{125}$ | 1 |
| $C_{126}$ | 1 |
| $C_{127}$ | -1 |
| $C_{128}$ | 1 | the second 128-length sequence, formed using the second 16-length sequence and the second 8length sequence, proportional to:

| Sequence Element | Value |
|---|---|
| $F_1$ | 1 |
| $F_2$ | −1 |
| $F_3$ | 1 |
| $F_4$ | 1 |
| $F_5$ | 1 |
| $F_6$ | −1 |
| $F_7$ | −1 |
| $F_8$ | −1 |
| $F_9$ | 1 |
| $F_{10}$ | −1 |
| $F_{11}$ | 1 |
| $F_{12}$ | 1 |
| $F_{13}$ | 1 |
| $F_{14}$ | −1 |
| $F_{15}$ | −1 |
| $F_{16}$ | −1 |
| $F_{17}$ | −1 |
| $F_{18}$ | 1 |
| $F_{19}$ | −1 |
| $F_{20}$ | −1 |
| $F_{21}$ | −1 |
| $F_{22}$ | 1 |
| $F_{23}$ | 1 |
| $F_{24}$ | 1 |
| $F_{25}$ | 1 |
| $F_{26}$ | −1 |
| $F_{27}$ | 1 |
| $F_{28}$ | 1 |
| $F_{29}$ | 1 |
| $F_{30}$ | −1 |
| $F_{31}$ | −1 |
| $F_{32}$ | −1 |
| $F_{33}$ | −1 |
| $F_{34}$ | 1 |
| $F_{35}$ | −1 |
| $F_{36}$ | −1 |
| $F_{37}$ | −1 |
| $F_{38}$ | 1 |
| $F_{39}$ | 1 |
| $F_{40}$ | 1 |
| $F_{41}$ | 1 |
| $F_{42}$ | −1 |
| $F_{43}$ | 1 |
| $F_{44}$ | 1 |
| $F_{45}$ | 1 |
| $F_{46}$ | −1 |
| $F_{47}$ | −1 |
| $F_{48}$ | −1 |
| $F_{49}$ | −1 |
| $F_{50}$ | 1 |
| $F_{51}$ | −1 |
| $F_{52}$ | −1 |
| $F_{53}$ | −1 |
| $F_{54}$ | 1 |
| $F_{55}$ | 1 |
| $F_{56}$ | 1 |
| $F_{57}$ | 1 |
| $F_{58}$ | −1 |
| $F_{59}$ | 1 |
| $F_{60}$ | 1 |
| $F_{61}$ | 1 |
| $F_{62}$ | −1 |
| $F_{63}$ | −1 |
| $F_{64}$ | −1 |
| $F_{65}$ | 1 |
| $F_{66}$ | −1 |
| $F_{67}$ | 1 |
| $F_{68}$ | 1 |
| $F_{69}$ | 1 |
| $F_{70}$ | −1 |
| $F_{71}$ | −1 |
| $F_{72}$ | −1 |
| $F_{73}$ | −1 |
| $F_{74}$ | 1 |
| $F_{75}$ | −1 |
| $F_{76}$ | −1 |
| $F_{77}$ | −1 |
| $F_{78}$ | 1 |
| $F_{79}$ | 1 |
| $F_{80}$ | 1 |
| $F_{81}$ | 1 |
| $F_{82}$ | −1 |
| $F_{83}$ | 1 |
| $F_{84}$ | 1 |
| $F_{85}$ | 1 |
| $F_{86}$ | −1 |
| $F_{87}$ | −1 |
| $F_{88}$ | −1 |
| $F_{89}$ | 1 |
| $F_{90}$ | −1 |
| $F_{91}$ | 1 |
| $F_{92}$ | 1 |
| $F_{93}$ | 1 |
| $F_{94}$ | −1 |
| $F_{95}$ | −1 |
| $F_{96}$ | −1 |
| $F_{97}$ | 1 |
| $F_{98}$ | −1 |
| $F_{99}$ | 1 |
| $F_{100}$ | 1 |
| $F_{101}$ | 1 |
| $F_{102}$ | −1 |
| $F_{103}$ | −1 |
| $F_{104}$ | −1 |
| $F_{105}$ | 1 |
| $F_{106}$ | −1 |
| $F_{107}$ | 1 |
| $F_{108}$ | 1 |
| $F_{109}$ | 1 |
| $F_{110}$ | −1 |
| $F_{111}$ | −1 |
| $F_{112}$ | −1 |
| $F_{113}$ | −1 |
| $F_{114}$ | 1 |
| $F_{115}$ | −1 |
| $F_{116}$ | −1 |
| $F_{117}$ | −1 |
| $F_{118}$ | 1 |
| $F_{119}$ | 1 |
| $F_{120}$ | 1 |
| $F_{121}$ | −1 |
| $F_{122}$ | 1 |
| $F_{123}$ | −1 |
| $F_{124}$ | −1 |
| $F_{125}$ | −1 |
| $F_{126}$ | 1 |
| $F_{127}$ | 1 |
| $F_{128}$ | 1 | and the third 128-length sequence, formed using the third 16-length sequence and the third 8-length sequence, proportional to:

| Sequence Element | Value |
|---|---|
| $J_1$ | 1 |
| $J_2$ | 1 |
| $J_3$ | 1 |
| $J_4$ | −1 |
| $J_5$ | −1 |
| $J_6$ | −1 |
| $J_7$ | 1 |
| $J_8$ | −1 |
| $J_9$ | 1 |
| $J_{10}$ | 1 |
| $J_{11}$ | 1 |
| $J_{12}$ | −1 |

| Sequence Element | Value |
| --- | --- |
| $J_{13}$ | −1 |
| $J_{14}$ | −1 |
| $J_{15}$ | 1 |
| $J_{16}$ | −1 |
| $J_{17}$ | −1 |
| $J_{18}$ | −1 |
| $J_{19}$ | −1 |
| $J_{20}$ | 1 |
| $J_{21}$ | 1 |
| $J_{22}$ | 1 |
| $J_{23}$ | −1 |
| $J_{24}$ | 1 |
| $J_{25}$ | −1 |
| $J_{26}$ | −1 |
| $J_{27}$ | −1 |
| $J_{28}$ | 1 |
| $J_{29}$ | 1 |
| $J_{30}$ | 1 |
| $J_{31}$ | −1 |
| $J_{32}$ | 1 |
| $J_{33}$ | −1 |
| $J_{34}$ | −1 |
| $J_{35}$ | −1 |
| $J_{36}$ | 1 |
| $J_{37}$ | 1 |
| $J_{38}$ | 1 |
| $J_{39}$ | −1 |
| $J_{40}$ | 1 |
| $J_{41}$ | −1 |
| $J_{42}$ | −1 |
| $J_{43}$ | −1 |
| $J_{44}$ | 1 |
| $J_{45}$ | 1 |
| $J_{46}$ | 1 |
| $J_{47}$ | −1 |
| $J_{48}$ | 1 |
| $J_{49}$ | 1 |
| $J_{50}$ | 1 |
| $J_{51}$ | 1 |
| $J_{52}$ | −1 |
| $J_{53}$ | −1 |
| $J_{54}$ | −1 |
| $J_{55}$ | 1 |
| $J_{56}$ | −1 |
| $J_{57}$ | −1 |
| $J_{58}$ | −1 |
| $J_{59}$ | −1 |
| $J_{60}$ | 1 |
| $J_{61}$ | 1 |
| $J_{62}$ | 1 |
| $J_{63}$ | −1 |
| $J_{64}$ | 1 |
| $J_{65}$ | −1 |
| $J_{66}$ | −1 |
| $J_{67}$ | −1 |
| $J_{68}$ | 1 |
| $J_{69}$ | 1 |
| $J_{70}$ | 1 |
| $J_{71}$ | −1 |
| $J_{72}$ | 1 |
| $J_{73}$ | 1 |
| $J_{74}$ | 1 |
| $J_{75}$ | 1 |
| $J_{76}$ | −1 |
| $J_{77}$ | −1 |
| $J_{78}$ | −1 |
| $J_{79}$ | 1 |
| $J_{80}$ | −1 |
| $J_{81}$ | −1 |
| $J_{82}$ | −1 |
| $J_{83}$ | −1 |
| $J_{84}$ | 1 |
| $J_{85}$ | 1 |
| $J_{86}$ | 1 |
| $J_{87}$ | −1 |
| $J_{88}$ | 1 |
| $J_{89}$ | 1 |
| $J_{90}$ | 1 |
| $J_{91}$ | 1 |
| $J_{92}$ | −1 |
| $J_{93}$ | −1 |
| $J_{94}$ | −1 |
| $J_{95}$ | 1 |
| $J_{96}$ | −1 |
| $J_{97}$ | −1 |
| $J_{98}$ | −1 |
| $J_{99}$ | −1 |
| $J_{100}$ | 1 |
| $J_{101}$ | 1 |
| $J_{102}$ | 1 |
| $J_{103}$ | −1 |
| $J_{104}$ | 1 |
| $J_{105}$ | 1 |
| $J_{106}$ | 1 |
| $J_{107}$ | 1 |
| $J_{108}$ | −1 |
| $J_{109}$ | −1 |
| $J_{110}$ | −1 |
| $J_{111}$ | 1 |
| $J_{112}$ | −1 |
| $J_{113}$ | −1 |
| $J_{114}$ | −1 |
| $J_{115}$ | −1 |
| $J_{116}$ | 1 |
| $J_{117}$ | 1 |
| $J_{118}$ | 1 |
| $J_{119}$ | −1 |
| $J_{120}$ | 1 |
| $J_{121}$ | −1 |
| $J_{122}$ | −1 |
| $J_{123}$ | −1 |
| $J_{124}$ | 1 |
| $J_{125}$ | 1 |
| $J_{126}$ | 1 |
| $J_{127}$ | −1 |
| $J_{128}$ | 1. |

10. The wireless device of claim 9, wherein the spectrally flattened 128-length sequence is selected from the group consisting of a first spectrally flattened 128-length sequence, a second spectrally flattened 128-length sequence, and a third spectrally flattened 128-length sequence, the first spectrally flattened 128-length sequence, based on the first 128-length sequence, defined as proportional to:

| Sequence Element | Value |
| --- | --- |
| $C'_1$ | 0.9574 |
| $C'_2$ | 0.5270 |
| $C'_3$ | 1.5929 |
| $C'_4$ | −0.2500 |
| $C'_5$ | −0.2536 |
| $C'_6$ | −0.3023 |
| $C'_7$ | 1.2907 |
| $C'_8$ | −0.4258 |
| $C'_9$ | 1.0012 |
| $C'_{10}$ | 1.7704 |
| $C'_{11}$ | 0.8593 |
| $C'_{12}$ | −0.3719 |
| $C'_{13}$ | −1.3465 |
| $C'_{14}$ | −0.7419 |
| $C'_{15}$ | 1.5350 |
| $C'_{16}$ | −1.2180 |
| $C'_{17}$ | 0.6955 |
| $C'_{18}$ | 1.7204 |
| $C'_{19}$ | 0.1643 |

-continued

| Sequence Element | Value |
| --- | --- |
| $C'_{20}$ | −0.3347 |
| $C'_{21}$ | −1.7244 |
| $C'_{22}$ | −0.7447 |
| $C'_{23}$ | 1.1141 |
| $C'_{24}$ | −1.3541 |
| $C'_{25}$ | −0.7293 |
| $C'_{26}$ | 0.2682 |
| $C'_{27}$ | −1.2401 |
| $C'_{28}$ | 1.0527 |
| $C'_{29}$ | 0.1199 |
| $C'_{30}$ | 1.1496 |
| $C'_{31}$ | −1.0544 |
| $C'_{32}$ | 1.3176 |
| $C'_{33}$ | 0.8400 |
| $C'_{34}$ | 1.3980 |
| $C'_{35}$ | 1.1147 |
| $C'_{36}$ | −0.4732 |
| $C'_{37}$ | −1.7178 |
| $C'_{38}$ | −0.8477 |
| $C'_{39}$ | 1.5083 |
| $C'_{40}$ | −1.4364 |
| $C'_{41}$ | 0.3853 |
| $C'_{42}$ | 1.5673 |
| $C'_{43}$ | 0.0295 |
| $C'_{44}$ | −0.4204 |
| $C'_{45}$ | −1.4856 |
| $C'_{46}$ | −0.8404 |
| $C'_{47}$ | 1.0111 |
| $C'_{48}$ | −1.4269 |
| $C'_{49}$ | 0.3033 |
| $C'_{50}$ | 0.7757 |
| $C'_{51}$ | −0.1370 |
| $C'_{52}$ | −0.5250 |
| $C'_{53}$ | −1.1589 |
| $C'_{54}$ | −0.8324 |
| $C'_{55}$ | 0.6336 |
| $C'_{56}$ | −1.2698 |
| $C'_{57}$ | −0.7853 |
| $C'_{58}$ | −0.7031 |
| $C'_{59}$ | −1.1106 |
| $C'_{60}$ | 0.6071 |
| $C'_{61}$ | 0.7164 |
| $C'_{62}$ | 0.8305 |
| $C'_{63}$ | −1.2355 |
| $C'_{64}$ | 1.1754 |
| $C'_{65}$ | 0.5859 |
| $C'_{66}$ | 0.3053 |
| $C'_{67}$ | 0.2408 |
| $C'_{68}$ | −0.6744 |
| $C'_{69}$ | −0.2361 |
| $C'_{70}$ | −0.8133 |
| $C'_{71}$ | 0.9201 |
| $C'_{72}$ | −1.0841 |
| $C'_{73}$ | −0.8036 |
| $C'_{74}$ | −0.3105 |
| $C'_{75}$ | −1.0514 |
| $C'_{76}$ | 0.7644 |
| $C'_{77}$ | 0.7301 |
| $C'_{78}$ | 0.9788 |
| $C'_{79}$ | −1.1305 |
| $C'_{80}$ | 1.3257 |
| $C'_{81}$ | 0.7801 |
| $C'_{82}$ | 0.7867 |
| $C'_{83}$ | 1.0996 |
| $C'_{84}$ | −0.5623 |
| $C'_{85}$ | −1.2227 |
| $C'_{86}$ | −0.8223 |
| $C'_{87}$ | 1.2074 |
| $C'_{88}$ | −1.2338 |
| $C'_{89}$ | 0.2957 |
| $C'_{90}$ | 1.0999 |
| $C'_{91}$ | −0.0201 |
| $C'_{92}$ | −0.5194 |
| $C'_{93}$ | −1.2284 |
| $C'_{94}$ | −0.9215 |
| $C'_{95}$ | 0.7941 |

-continued

| Sequence Element | Value |
| --- | --- |
| $C'_{96}$ | −1.4128 |
| $C'_{97}$ | −0.8528 |
| $C'_{98}$ | −0.6973 |
| $C'_{99}$ | −1.2477 |
| $C'_{100}$ | 0.6246 |
| $C'_{101}$ | 0.7687 |
| $C'_{102}$ | 0.7966 |
| $C'_{103}$ | −1.2809 |
| $C'_{104}$ | 1.1023 |
| $C'_{105}$ | 0.4250 |
| $C'_{106}$ | −0.1614 |
| $C'_{107}$ | 0.7547 |
| $C'_{108}$ | −0.6696 |
| $C'_{109}$ | −0.3920 |
| $C'_{110}$ | −0.7589 |
| $C'_{111}$ | 0.6701 |
| $C'_{112}$ | −0.9381 |
| $C'_{113}$ | −0.7483 |
| $C'_{114}$ | −0.9659 |
| $C'_{115}$ | −0.9192 |
| $C'_{116}$ | 0.3925 |
| $C'_{117}$ | 1.2864 |
| $C'_{118}$ | 0.6784 |
| $C'_{119}$ | −1.0909 |
| $C'_{120}$ | 1.1140 |
| $C'_{121}$ | −0.6134 |
| $C'_{122}$ | −1.5467 |
| $C'_{123}$ | −0.3031 |
| $C'_{124}$ | 0.9457 |
| $C'_{125}$ | 1.9645 |
| $C'_{126}$ | 1.4549 |
| $C'_{127}$ | −1.2760 |
| $C'_{128}$ | 2.2102 | the second spectrally flattened 128-length sequence, based on the second 128-length sequence, defined as proportional to:

| Sequence Element | Value |
| --- | --- |
| $F'_{1}$ | 1.2947 |
| $F'_{2}$ | −0.8188 |
| $F'_{3}$ | 0.9007 |
| $F'_{4}$ | 0.7786 |
| $F'_{5}$ | 0.6301 |
| $F'_{6}$ | −0.1283 |
| $F'_{7}$ | −0.7972 |
| $F'_{8}$ | −0.3897 |
| $F'_{9}$ | 1.1794 |
| $F'_{10}$ | −1.2592 |
| $F'_{11}$ | 0.8136 |
| $F'_{12}$ | 0.8872 |
| $F'_{13}$ | 0.5797 |
| $F'_{14}$ | −1.2304 |
| $F'_{15}$ | −0.5628 |
| $F'_{16}$ | −0.8272 |
| $F'_{17}$ | −1.5418 |
| $F'_{18}$ | 1.2804 |
| $F'_{19}$ | −1.1524 |
| $F'_{20}$ | −0.9846 |
| $F'_{21}$ | −0.9178 |
| $F'_{22}$ | 1.1834 |
| $F'_{23}$ | 0.4293 |
| $F'_{24}$ | 0.9021 |
| $F'_{25}$ | 1.1152 |
| $F'_{26}$ | −0.9828 |
| $F'_{27}$ | 0.7891 |
| $F'_{28}$ | 0.9391 |
| $F'_{29}$ | 0.5944 |
| $F'_{30}$ | −0.8376 |
| $F'_{31}$ | −0.5320 |
| $F'_{32}$ | −0.6335 |

| Sequence Element | Value |
|---|---|
| $F'_{33}$ | −0.9973 |
| $F'_{34}$ | 0.8548 |
| $F'_{35}$ | −0.6963 |
| $F'_{36}$ | −0.6874 |
| $F'_{37}$ | −0.5015 |
| $F'_{38}$ | 0.7003 |
| $F'_{39}$ | 0.3582 |
| $F'_{40}$ | 0.5772 |
| $F'_{41}$ | 0.7421 |
| $F'_{42}$ | −0.6766 |
| $F'_{43}$ | 0.6242 |
| $F'_{44}$ | 0.4241 |
| $F'_{45}$ | 0.5891 |
| $F'_{46}$ | −0.9045 |
| $F'_{47}$ | 0.1625 |
| $F'_{48}$ | −0.5105 |
| $F'_{49}$ | −1.4187 |
| $F'_{50}$ | 1.5169 |
| $F'_{51}$ | −0.9580 |
| $F'_{52}$ | −1.1237 |
| $F'_{53}$ | −0.6782 |
| $F'_{54}$ | 1.3557 |
| $F'_{55}$ | 1.0229 |
| $F'_{56}$ | 0.9490 |
| $F'_{57}$ | 1.6308 |
| $F'_{58}$ | −0.9325 |
| $F'_{59}$ | 1.1461 |
| $F'_{60}$ | 1.1675 |
| $F'_{61}$ | 0.8163 |
| $F'_{62}$ | −0.1551 |
| $F'_{63}$ | −0.8657 |
| $F'_{64}$ | −0.3696 |
| $F'_{65}$ | 1.0703 |
| $F'_{66}$ | −0.8625 |
| $F'_{67}$ | 0.6986 |
| $F'_{68}$ | 1.0989 |
| $F'_{69}$ | 0.4600 |
| $F'_{70}$ | −0.6559 |
| $F'_{71}$ | −0.6087 |
| $F'_{72}$ | −0.4206 |
| $F'_{73}$ | −0.8454 |
| $F'_{74}$ | 1.0317 |
| $F'_{75}$ | −0.7624 |
| $F'_{76}$ | 0.0619 |
| $F'_{77}$ | −0.7311 |
| $F'_{78}$ | 1.3634 |
| $F'_{79}$ | −0.1379 |
| $F'_{80}$ | 0.8401 |
| $F'_{81}$ | 1.6371 |
| $F'_{82}$ | −1.0201 |
| $F'_{83}$ | 0.9243 |
| $F'_{84}$ | 2.0931 |
| $F'_{85}$ | 0.4511 |
| $F'_{86}$ | 0.0768 |
| $F'_{87}$ | −1.7974 |
| $F'_{88}$ | −0.4685 |
| $F'_{89}$ | 1.4727 |
| $F'_{90}$ | −1.3387 |
| $F'_{91}$ | 0.7779 |
| $F'_{92}$ | 2.0080 |
| $F'_{93}$ | 0.3026 |
| $F'_{94}$ | −0.4263 |
| $F'_{95}$ | −1.9751 |
| $F'_{96}$ | −0.8421 |
| $F'_{97}$ | 0.9516 |
| $F'_{98}$ | −1.2593 |
| $F'_{99}$ | 0.4594 |
| $F'_{100}$ | 1.3038 |
| $F'_{101}$ | 0.1090 |
| $F'_{102}$ | −0.5082 |
| $F'_{103}$ | −1.8181 |
| $F'_{104}$ | −0.7747 |
| $F'_{105}$ | 0.7678 |
| $F'_{106}$ | −1.5342 |
| $F'_{107}$ | 0.4914 |
| $F'_{108}$ | 0.7197 |
| $F'_{109}$ | 0.3353 |
| $F'_{110}$ | −1.5832 |
| $F'_{111}$ | −0.9947 |
| $F'_{112}$ | −1.0329 |
| $F'_{113}$ | −1.9669 |
| $F'_{114}$ | 0.9946 |
| $F'_{115}$ | −1.3273 |
| $F'_{116}$ | −1.5572 |
| $F'_{117}$ | −0.8746 |
| $F'_{118}$ | 0.0579 |
| $F'_{119}$ | 1.2269 |
| $F'_{120}$ | 0.4497 |
| $F'_{121}$ | −1.4751 |
| $F'_{122}$ | 1.3897 |
| $F'_{123}$ | −0.9922 |
| $F'_{124}$ | −1.2950 |
| $F'_{125}$ | −0.6839 |
| $F'_{126}$ | 1.2113 |
| $F'_{127}$ | 1.0559 |
| $F'_{128}$ | 0.8147 | the third spectrally flattened 128-length sequence, based on the third 128-length sequence, defined as proportional to:

| Sequence Element | Value |
|---|---|
| $J'_1$ | 0.8147 |
| $J'_2$ | 1.0559 |
| $J'_3$ | 1.2113 |
| $J'_4$ | −0.6839 |
| $J'_5$ | −1.2950 |
| $J'_6$ | −0.9922 |
| $J'_7$ | 1.3897 |
| $J'_8$ | −1.4751 |
| $J'_9$ | 0.4497 |
| $J'_{10}$ | 1.2269 |
| $J'_{11}$ | 0.0579 |
| $J'_{12}$ | −0.8746 |
| $J'_{13}$ | −1.5572 |
| $J'_{14}$ | −1.3273 |
| $J'_{15}$ | 0.9946 |
| $J'_{16}$ | −1.9669 |
| $J'_{17}$ | −1.0329 |

-continued

| Sequence Element | Value |
|---|---|
| $J'_{18}$ | −0.9947 |
| $J'_{19}$ | −1.5832 |
| $J'_{20}$ | 0.3353 |
| $J'_{21}$ | 0.7197 |
| $J'_{22}$ | 0.4914 |
| $J'_{23}$ | −1.5342 |
| $J'_{24}$ | 0.7678 |
| $J'_{25}$ | −0.7747 |
| $J'_{26}$ | −1.8181 |
| $J'_{27}$ | −0.5082 |
| $J'_{28}$ | 0.1090 |
| $J'_{29}$ | 1.3038 |
| $J'_{30}$ | 0.4594 |
| $J'_{31}$ | −1.2593 |
| $J'_{32}$ | 0.9516 |
| $J'_{33}$ | −0.8421 |
| $J'_{34}$ | −1.9751 |
| $J'_{35}$ | −0.4263 |
| $J'_{36}$ | 0.3026 |
| $J'_{37}$ | 2.0080 |
| $J'_{38}$ | 0.7779 |
| $J'_{39}$ | −1.3387 |
| $J'_{40}$ | 1.4727 |
| $J'_{41}$ | −0.4685 |
| $J'_{42}$ | −1.7974 |
| $J'_{43}$ | 0.0768 |
| $J'_{44}$ | 0.4511 |
| $J'_{45}$ | 2.0931 |
| $J'_{46}$ | 0.9243 |
| $J'_{47}$ | −1.0201 |
| $J'_{48}$ | 1.6371 |
| $J'_{49}$ | 0.8401 |
| $J'_{50}$ | −0.1379 |
| $J'_{51}$ | 1.3634 |
| $J'_{52}$ | −0.7311 |
| $J'_{53}$ | 0.0619 |
| $J'_{54}$ | −0.7624 |
| $J'_{55}$ | 1.0317 |
| $J'_{56}$ | −0.8454 |
| $J'_{57}$ | −0.4206 |
| $J'_{58}$ | −0.6087 |
| $J'_{59}$ | −0.6559 |
| $J'_{60}$ | 0.4600 |
| $J'_{61}$ | 1.0989 |
| $J'_{62}$ | 0.6986 |
| $J'_{63}$ | −0.8625 |
| $J'_{64}$ | 1.0703 |
| $J'_{65}$ | −0.3696 |
| $J'_{66}$ | −0.8657 |
| $J'_{67}$ | −0.1551 |
| $J'_{68}$ | 0.8163 |
| $J'_{69}$ | 1.1675 |
| $J'_{70}$ | 1.1461 |
| $J'_{71}$ | −0.9325 |
| $J'_{72}$ | 1.6308 |
| $J'_{73}$ | 0.9490 |
| $J'_{74}$ | 1.0229 |
| $J'_{75}$ | 1.3557 |
| $J'_{76}$ | −0.6782 |
| $J'_{77}$ | −1.1237 |
| $J'_{78}$ | −0.9580 |
| $J'_{79}$ | 1.5169 |
| $J'_{80}$ | −1.4187 |
| $J'_{81}$ | −0.5105 |
| $J'_{82}$ | 0.1625 |
| $J'_{83}$ | −0.9045 |
| $J'_{84}$ | 0.5891 |
| $J'_{85}$ | 0.4241 |
| $J'_{86}$ | 0.6242 |
| $J'_{87}$ | −0.6766 |
| $J'_{88}$ | 0.7421 |
| $J'_{89}$ | 0.5772 |
| $J'_{90}$ | 0.3582 |
| $J'_{91}$ | 0.7003 |
| $J'_{92}$ | −0.5015 |
| $J'_{93}$ | −0.6874 |

-continued

| Sequence Element | Value |
|---|---|
| $J'_{94}$ | −0.6963 |
| $J'_{95}$ | 0.8548 |
| $J'_{96}$ | −0.9973 |
| $J'_{97}$ | −0.6335 |
| $J'_{98}$ | −0.5320 |
| $J'_{99}$ | −0.8376 |
| $J'_{100}$ | 0.5944 |
| $J'_{101}$ | 0.9391 |
| $J'_{102}$ | 0.7891 |
| $J'_{103}$ | −0.9828 |
| $J'_{104}$ | 1.1152 |
| $J'_{105}$ | 0.9021 |
| $J'_{106}$ | 0.4293 |
| $J'_{107}$ | 1.1834 |
| $J'_{108}$ | −0.9178 |
| $J'_{109}$ | −0.9846 |
| $J'_{110}$ | −1.1524 |
| $J'_{111}$ | 1.2804 |
| $J'_{112}$ | −1.5418 |
| $J'_{113}$ | −0.8272 |
| $J'_{114}$ | −0.5628 |
| $J'_{115}$ | −1.2304 |
| $J'_{116}$ | 0.5797 |
| $J'_{117}$ | 0.8872 |
| $J'_{118}$ | 0.8136 |
| $J'_{119}$ | −1.2592 |
| $J'_{120}$ | 1.1794 |
| $J'_{121}$ | −0.3897 |
| $J'_{122}$ | −0.7972 |
| $J'_{123}$ | −0.1283 |
| $J'_{124}$ | 0.6301 |
| $J'_{125}$ | 0.7786 |
| $J'_{126}$ | 0.9007 |
| $J'_{127}$ | −0.8188 |
| $J'_{128}$ | 1.2947. |

11. The wireless device of claim 6, wherein the correlator component comprises a first spreader and a second spreader, and distinguishes the wireless transmission containing the preamble by spreading at least a portion of the wireless transmission with the 8-length sequence through the first spreader, and by spreading the output of the first spreader with the 16-length sequence through the second spreader, the output of the second spreader providing an indication of the presence of the preamble in the wireless transmission, wherein the first 16-length sequence is defined as proportional to

| $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ |
|---|---|---|---|---|---|---|---|---|---|---|---|---|---|---|---|
| 1 | 1 | 1 | −1 | 1 | 1 | 1 | −1 | 1 | −1 | 1 | 1 | −1 | 1 | −1 | −1 | the second 16-length sequence is defined as proportional to

| $d_1$ | $d_2$ | $d_3$ | $d_4$ | $d_5$ | $d_6$ | $d_7$ | $d_8$ | $d_9$ | $d_{10}$ | $d_{11}$ | $d_{12}$ | $d_{13}$ | $d_{14}$ | $d_{15}$ | $d_{16}$ |
|---|---|---|---|---|---|---|---|---|---|---|---|---|---|---|---|
| 1 | 1 | −1 | 1 | −1 | 1 | −1 | 1 | 1 | −1 | 1 | 1 | 1 | 1 | −1 | −1 | the third 16-length sequence is defined as proportional to

| $g_1$ | $g_2$ | $g_3$ | $g_4$ | $g_5$ | $g_6$ | $g_7$ | $g_8$ | $g_9$ | $g_{10}$ | $g_{11}$ | $g_{12}$ | $g_{13}$ | $g_{14}$ | $g_{15}$ | $g_{16}$ |
|---|---|---|---|---|---|---|---|---|---|---|---|---|---|---|---|
| 1 | 1 | −1 | −1 | −1 | −1 | 1 | −1 | −1 | 1 | −1 | 1 | −1 | 1 | −1 | −1 | the first 8-length sequence is defined as proportional to

| $b_1$ | $b_2$ | $b_3$ | $b_4$ | $b_5$ | $b_6$ | $b_7$ | $b_8$ |
|---|---|---|---|---|---|---|---|
| 1 | 1 | 1 | −1 | −1 | −1 | 1 | −1 | the second 8-length sequence is defined as proportional to

| $e_1$ | $e_2$ | $e_3$ | $e_4$ | $e_5$ | $e_6$ | $e_7$ | $e_8$ |
|---|---|---|---|---|---|---|---|
| 1 | −1 | 1 | 1 | 1 | −1 | −1 | −1 | and the third 8-length sequence is defined as proportional to

| $h_1$ | $h_2$ | $h_3$ | $h_4$ | $h_5$ | $h_6$ | $h_7$ | $h_8$ |
|---|---|---|---|---|---|---|---|
| 1 | 1 | 1 | −1 | −1 | −1 | 1 | −1. |

12. The wireless device of claim 6, wherein the correlator component comprises a first spreader and a second spreader, and distinguishes the wireless transmission containing the preamble by spreading at least a portion of the wireless transmission with the 16-length sequence through the first spreader, and by spreading the output of the first spreader with the 8-length sequence through the second spreader, the output of the second spreader providing an indication of the presence of the preamble in the wireless transmission, wherein the first 16-length sequence is defined as proportional to

| $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ | $a_{16}$ |
|---|---|---|---|---|---|---|---|---|---|---|---|---|---|---|---|
| 1 | 1 | 1 | −1 | 1 | 1 | 1 | −1 | 1 | −1 | 1 | 1 | −1 | 1 | −1 | −1 | the second 16-length sequence is defined as proportional to

| $d_1$ | $d_2$ | $d_3$ | $d_4$ | $d_5$ | $d_6$ | $d_7$ | $d_8$ | $d_9$ | $d_{10}$ | $d_{11}$ | $d_{12}$ | $d_{13}$ | $d_{14}$ | $d_{15}$ | $d_{16}$ |
|---|---|---|---|---|---|---|---|---|---|---|---|---|---|---|---|
| 1 | 1 | −1 | 1 | −1 | 1 | −1 | 1 | 1 | −1 | 1 | 1 | 1 | 1 | −1 | −1 | the third 16-length sequence is defined as proportional to

| $g_1$ | $g_2$ | $g_3$ | $g_4$ | $g_5$ | $g_6$ | $g_7$ | $g_8$ | $g_9$ | $g_{10}$ | $g_{11}$ | $g_{12}$ | $g_{13}$ | $g_{14}$ | $g_{15}$ | $g_{16}$ |
|---|---|---|---|---|---|---|---|---|---|---|---|---|---|---|---|
| 1 | 1 | −1 | −1 | −1 | −1 | 1 | −1 | −1 | 1 | −1 | 1 | −1 | 1 | −1 | −1 | the first 8-length sequence is defined as proportional to

| $b_1$ | $b_2$ | $b_3$ | $b_4$ | $b_5$ | $b_6$ | $b_7$ | $b_8$ |
|---|---|---|---|---|---|---|---|
| 1 | 1 | 1 | −1 | −1 | −1 | 1 | −1 | the second 8-length sequence is defined as proportional to

| $e_1$ | $e_2$ | $e_3$ | $e_4$ | $e_5$ | $e_6$ | $e_7$ | $e_8$ |
|---|---|---|---|---|---|---|---|
| 1 | −1 | 1 | 1 | 1 | −1 | −1 | −1 | and the third 8-length sequence is defined as proportional to

| $h_1$ | $h_2$ | $h_3$ | $h_4$ | $h_5$ | $h_6$ | $h_7$ | $h_8$ |
|---|---|---|---|---|---|---|---|
| 1 | 1 | 1 | −1 | −1 | −1 | 1 | −1. |

13. A wireless device to distinguish communications, comprising:
a component operable for fixed frequency interleaved communication using a 128-length preamble equivalent to any one of a first 8-length and 16- length sequence, a second 8-length and 16-length sequence, and a third 8-length and 16-length sequence.

14. The wireless device of claim 13, wherein the component is a preamble component that provides the preamble from a memory area.

15. The wireless device of claim 13, wherein the preamble is formed by spreading any one of the first, second and third 8-length and 16-length sequences.

16. The wireless device of claim 13, wherein the preamble is formed by spreading one of the first 16-length sequence with the first 8-length sequence, the second 16-length sequence with the second 8-length sequence, and the third 16-length sequence with the third 8-length sequence.

17. The wireless device of claim 13, wherein the preamble is based on transforming a 128-length bi-phase valued sequence to adapt arbitrary spectral shaping which includes enhancing spectral energy density of the preamble, the 128-length bi-phase valued sequence based on the one of the first, second and third 8-length and 16-length sequences.

18. The wireless device of claim 13, wherein the component is a correlator component operable to distinguish communications using a 128-length bi-phase valued sequence based on one of the first, second and third 8-length and 16-length sequences.

19. The wireless device of claim 13, wherein the component is a correlator component operable to distinguish the communication using a 128-length sequence based on a transforming a 128-length bi-phase valued sequence to adapt arbitrary spectral shaping which includes enhancing spectral energy density of the 128-length bi-phase valued sequence, the 128-length bi-phase valued sequence based on one of the first, second and third 8-length and 16-length sequences.

20. The wireless device of claim 13, wherein the component promotes communication in accordance with a multi-band orthogonal frequency division modulation alliance special interest group physical layer specification.

21. A circuit for a wireless receiver to despread a 128-length hierarchical sequence, the circuit comprising:
a despreader operable using one of a first 128-length sequence, a second 128-length sequence, a third 128-length sequence, a first spectrally flattened 128-length sequence, a second spectrally flattened 128-length sequence, and a third spectrally flattened 128-length sequence to despread a received signal, the received signal defined as a fixed frequency interleaved transmission having one of a first preamble, a second preamble, and a third preamble, when the received signal contains the first preamble, the despreader using one of the first 128-length sequence and the first spectrally flattened 128-length sequence, the first 128-length sequence defined as proportional to:

| Sequence Element | Value |
|---|---|
| $C_1$ | 1 |
| $C_2$ | 1 |
| $C_3$ | 1 |
| $C_4$ | −1 |
| $C_5$ | −1 |
| $C_6$ | −1 |
| $C_7$ | 1 |
| $C_8$ | −1 |
| $C_9$ | 1 |
| $C_{10}$ | 1 |
| $C_{11}$ | 1 |
| $C_{12}$ | −1 |
| $C_{13}$ | −1 |
| $C_{14}$ | −1 |
| $C_{15}$ | 1 |
| $C_{16}$ | −1 |
| $C_{17}$ | 1 |
| $C_{18}$ | 1 |
| $C_{19}$ | 1 |
| $C_{20}$ | −1 |
| $C_{21}$ | −1 |
| $C_{22}$ | −1 |
| $C_{23}$ | 1 |
| $C_{24}$ | −1 |
| $C_{25}$ | −1 |
| $C_{26}$ | −1 |
| $C_{27}$ | −1 |
| $C_{28}$ | 1 |
| $C_{29}$ | 1 |
| $C_{30}$ | 1 |
| $C_{31}$ | −1 |
| $C_{32}$ | 1 |
| $C_{33}$ | 1 |
| $C_{34}$ | 1 |
| $C_{35}$ | 1 |
| $C_{36}$ | −1 |
| $C_{37}$ | −1 |
| $C_{38}$ | −1 |

-continued

| Sequence Element | Value |
| --- | --- |
| $C_{39}$ | 1 |
| $C_{40}$ | -1 |
| $C_{41}$ | 1 |
| $C_{42}$ | 1 |
| $C_{43}$ | 1 |
| $C_{44}$ | -1 |
| $C_{45}$ | -1 |
| $C_{46}$ | -1 |
| $C_{47}$ | 1 |
| $C_{48}$ | -1 |
| $C_{49}$ | 1 |
| $C_{50}$ | 1 |
| $C_{51}$ | 1 |
| $C_{52}$ | -1 |
| $C_{53}$ | -1 |
| $C_{54}$ | -1 |
| $C_{55}$ | 1 |
| $C_{56}$ | -1 |
| $C_{57}$ | -1 |
| $C_{58}$ | -1 |
| $C_{59}$ | -1 |
| $C_{60}$ | 1 |
| $C_{61}$ | 1 |
| $C_{62}$ | 1 |
| $C_{63}$ | -1 |
| $C_{64}$ | 1 |
| $C_{65}$ | 1 |
| $C_{66}$ | 1 |
| $C_{67}$ | 1 |
| $C_{68}$ | -1 |
| $C_{69}$ | -1 |
| $C_{70}$ | -1 |
| $C_{71}$ | 1 |
| $C_{72}$ | -1 |
| $C_{73}$ | -1 |
| $C_{74}$ | -1 |
| $C_{75}$ | -1 |
| $C_{76}$ | 1 |
| $C_{77}$ | 1 |
| $C_{78}$ | 1 |
| $C_{79}$ | -1 |
| $C_{80}$ | 1 |
| $C_{81}$ | 1 |
| $C_{82}$ | 1 |
| $C_{83}$ | 1 |
| $C_{84}$ | -1 |
| $C_{85}$ | -1 |
| $C_{86}$ | -1 |
| $C_{87}$ | 1 |
| $C_{88}$ | -1 |
| $C_{89}$ | 1 |
| $C_{90}$ | 1 |
| $C_{91}$ | 1 |
| $C_{92}$ | -1 |
| $C_{93}$ | -1 |
| $C_{94}$ | -1 |
| $C_{95}$ | 1 |
| $C_{96}$ | -1 |
| $C_{97}$ | -1 |
| $C_{98}$ | -1 |
| $C_{99}$ | -1 |
| $C_{100}$ | 1 |
| $C_{101}$ | 1 |
| $C_{102}$ | 1 |
| $C_{103}$ | -1 |
| $C_{104}$ | 1 |
| $C_{105}$ | 1 |
| $C_{106}$ | 1 |
| $C_{107}$ | 1 |
| $C_{108}$ | -1 |
| $C_{109}$ | -1 |
| $C_{110}$ | -1 |
| $C_{111}$ | 1 |
| $C_{112}$ | -1 |
| $C_{113}$ | -1 |
| $C_{114}$ | -1 |

-continued

| Sequence Element | Value |
| --- | --- |
| $C_{115}$ | -1 |
| $C_{116}$ | 1 |
| $C_{117}$ | 1 |
| $C_{118}$ | 1 |
| $C_{119}$ | -1 |
| $C_{120}$ | 1 |
| $C_{121}$ | -1 |
| $C_{122}$ | -1 |
| $C_{123}$ | -1 |
| $C_{124}$ | 1 |
| $C_{125}$ | 1 |
| $C_{126}$ | 1 |
| $C_{127}$ | -1 |
| $C_{128}$ | 1 | and the first spectrally flattened 128-length sequence defined as proportional to:

| Sequence Element | Value |
| --- | --- |
| $C'_{1}$ | 0.9574 |
| $C'_{2}$ | 0.5270 |
| $C'_{3}$ | 1.5929 |
| $C'_{4}$ | -0.2500 |
| $C'_{5}$ | -0.2536 |
| $C'_{6}$ | -0.3023 |
| $C'_{7}$ | 1.2907 |
| $C'_{8}$ | -0.4258 |
| $C'_{9}$ | 1.0012 |
| $C'_{10}$ | 1.7704 |
| $C'_{11}$ | 0.8593 |
| $C'_{12}$ | -0.3719 |
| $C'_{13}$ | -1.3465 |
| $C'_{14}$ | -0.7419 |
| $C'_{15}$ | 1.5350 |
| $C'_{16}$ | -1.2180 |
| $C'_{17}$ | 0.6955 |
| $C'_{18}$ | 1.7204 |
| $C'_{19}$ | 0.1643 |
| $C'_{20}$ | -0.3347 |
| $C'_{21}$ | -1.7244 |
| $C'_{22}$ | -0.7447 |
| $C'_{23}$ | 1.1141 |
| $C'_{24}$ | -1.3541 |
| $C'_{25}$ | -0.7293 |
| $C'_{26}$ | 0.2682 |
| $C'_{27}$ | -1.2401 |
| $C'_{28}$ | 1.0527 |
| $C'_{29}$ | 0.1199 |
| $C'_{30}$ | 1.1496 |
| $C'_{31}$ | -1.0544 |
| $C'_{32}$ | 1.3176 |
| $C'_{33}$ | 0.8400 |
| $C'_{34}$ | 1.3980 |
| $C'_{35}$ | 1.1147 |
| $C'_{36}$ | -0.4732 |
| $C'_{37}$ | -1.7178 |
| $C'_{38}$ | -0.8477 |
| $C'_{39}$ | 1.5083 |
| $C'_{40}$ | -1.4364 |
| $C'_{41}$ | 0.3853 |
| $C'_{42}$ | 1.5673 |
| $C'_{43}$ | 0.0295 |
| $C'_{44}$ | -0.4204 |
| $C'_{45}$ | -1.4856 |
| $C'_{46}$ | -0.8404 |
| $C'_{47}$ | 1.0111 |
| $C'_{48}$ | -1.4269 |
| $C'_{49}$ | 0.3033 |
| $C'_{50}$ | 0.7757 |
| $C'_{51}$ | -0.1370 |

-continued

| Sequence Element | Value |
|---|---|
| $C'_{52}$ | −0.5250 |
| $C'_{53}$ | −1.1589 |
| $C'_{54}$ | −0.8324 |
| $C'_{55}$ | 0.6336 |
| $C'_{56}$ | −1.2698 |
| $C'_{57}$ | −0.7853 |
| $C'_{58}$ | −0.7031 |
| $C'_{59}$ | −1.1106 |
| $C'_{60}$ | 0.6071 |
| $C'_{61}$ | 0.7164 |
| $C'_{62}$ | 0.8305 |
| $C'_{63}$ | −1.2355 |
| $C'_{64}$ | 1.1754 |
| $C'_{65}$ | 0.5859 |
| $C'_{66}$ | 0.3053 |
| $C'_{67}$ | 0.2408 |
| $C'_{68}$ | −0.6744 |
| $C'_{69}$ | −0.2361 |
| $C'_{70}$ | −0.8133 |
| $C'_{71}$ | 0.9201 |
| $C'_{72}$ | −1.0841 |
| $C'_{73}$ | −0.8036 |
| $C'_{74}$ | −0.3105 |
| $C'_{75}$ | −1.0514 |
| $C'_{76}$ | 0.7644 |
| $C'_{77}$ | 0.7301 |
| $C'_{78}$ | 0.9788 |
| $C'_{79}$ | −1.1305 |
| $C'_{80}$ | 1.3257 |
| $C'_{81}$ | 0.7801 |
| $C'_{82}$ | 0.7867 |
| $C'_{83}$ | 1.0996 |
| $C'_{84}$ | −0.5623 |
| $C'_{85}$ | −1.2227 |
| $C'_{86}$ | −0.8223 |
| $C'_{87}$ | 1.2074 |
| $C'_{88}$ | −1.2338 |
| $C'_{89}$ | 0.2957 |
| $C'_{90}$ | 1.0999 |
| $C'_{91}$ | −0.0201 |
| $C'_{92}$ | −0.5194 |
| $C'_{93}$ | −1.2284 |
| $C'_{94}$ | −0.9215 |
| $C'_{95}$ | 0.7941 |
| $C'_{96}$ | −1.4128 |
| $C'_{97}$ | −0.8528 |
| $C'_{98}$ | −0.6973 |
| $C'_{99}$ | −1.2477 |
| $C'_{100}$ | 0.6246 |
| $C'_{101}$ | 0.7687 |
| $C'_{102}$ | 0.7966 |
| $C'_{103}$ | −1.2809 |
| $C'_{104}$ | 1.1023 |
| $C'_{105}$ | 0.4250 |
| $C'_{106}$ | −0.1614 |
| $C'_{107}$ | 0.7547 |
| $C'_{108}$ | −0.6696 |
| $C'_{109}$ | −0.3920 |
| $C'_{110}$ | −0.7589 |
| $C'_{111}$ | 0.6701 |
| $C'_{112}$ | −0.9381 |
| $C'_{113}$ | −0.7483 |
| $C'_{114}$ | −0.9659 |
| $C'_{115}$ | −0.9192 |
| $C'_{116}$ | 0.3925 |
| $C'_{117}$ | 1.2864 |
| $C'_{118}$ | 0.6784 |
| $C'_{119}$ | −1.0909 |
| $C'_{120}$ | 1.1140 |
| $C'_{121}$ | −0.6134 |
| $C'_{122}$ | −1.5467 |
| $C'_{123}$ | −0.3031 |
| $C'_{124}$ | 0.9457 |
| $C'_{125}$ | 1.9645 |

-continued

| Sequence Element | Value |
|---|---|
| $C'_{126}$ | 1.4549 |
| $C'_{127}$ | −1.2760 |
| $C'_{128}$ | 2.2102 | when the received signal contains the second preamble, the despreader using one of the second 128-length sequence and the second spectrally flattened 128-length sequence, the second 128-length sequence defined as proportional to:

| Sequence Element | Value |
|---|---|
| $F_1$ | 1 |
| $F_2$ | −1 |
| $F_3$ | 1 |
| $F_4$ | 1 |
| $F_5$ | 1 |
| $F_6$ | −1 |
| $F_7$ | −1 |
| $F_8$ | −1 |
| $F_9$ | 1 |
| $F_{10}$ | −1 |
| $F_{11}$ | 1 |
| $F_{12}$ | 1 |
| $F_{13}$ | 1 |
| $F_{14}$ | −1 |
| $F_{15}$ | −1 |
| $F_{16}$ | −1 |
| $F_{17}$ | −1 |
| $F_{18}$ | 1 |
| $F_{19}$ | −1 |
| $F_{20}$ | −1 |
| $F_{21}$ | −1 |
| $F_{22}$ | 1 |
| $F_{23}$ | 1 |
| $F_{24}$ | 1 |
| $F_{25}$ | 1 |
| $F_{26}$ | −1 |
| $F_{27}$ | 1 |
| $F_{28}$ | 1 |
| $F_{29}$ | 1 |
| $F_{30}$ | −1 |
| $F_{31}$ | −1 |
| $F_{32}$ | −1 |
| $F_{33}$ | −1 |
| $F_{34}$ | 1 |
| $F_{35}$ | −1 |
| $F_{36}$ | −1 |
| $F_{37}$ | −1 |
| $F_{38}$ | 1 |
| $F_{39}$ | 1 |
| $F_{40}$ | 1 |
| $F_{41}$ | 1 |
| $F_{42}$ | −1 |
| $F_{43}$ | 1 |
| $F_{44}$ | 1 |
| $F_{45}$ | 1 |
| $F_{46}$ | −1 |
| $F_{47}$ | −1 |
| $F_{48}$ | −1 |
| $F_{49}$ | −1 |
| $F_{50}$ | 1 |
| $F_{51}$ | −1 |
| $F_{52}$ | −1 |
| $F_{53}$ | −1 |
| $F_{54}$ | 1 |
| $F_{55}$ | 1 |
| $F_{56}$ | 1 |
| $F_{57}$ | 1 |
| $F_{58}$ | −1 |
| $F_{59}$ | 1 |

-continued

| Sequence Element | Value |
|---|---|
| $F_{60}$ | 1 |
| $F_{61}$ | 1 |
| $F_{62}$ | -1 |
| $F_{63}$ | -1 |
| $F_{64}$ | -1 |
| $F_{65}$ | 1 |
| $F_{66}$ | -1 |
| $F_{67}$ | 1 |
| $F_{68}$ | 1 |
| $F_{69}$ | 1 |
| $F_{70}$ | -1 |
| $F_{71}$ | -1 |
| $F_{72}$ | -1 |
| $F_{73}$ | -1 |
| $F_{74}$ | 1 |
| $F_{75}$ | -1 |
| $F_{76}$ | -1 |
| $F_{77}$ | -1 |
| $F_{78}$ | 1 |
| $F_{79}$ | 1 |
| $F_{80}$ | 1 |
| $F_{81}$ | 1 |
| $F_{82}$ | -1 |
| $F_{83}$ | 1 |
| $F_{84}$ | 1 |
| $F_{85}$ | 1 |
| $F_{86}$ | -1 |
| $F_{87}$ | -1 |
| $F_{88}$ | -1 |
| $F_{89}$ | 1 |
| $F_{90}$ | -1 |
| $F_{91}$ | 1 |
| $F_{92}$ | 1 |
| $F_{93}$ | 1 |
| $F_{94}$ | -1 |
| $F_{95}$ | -1 |
| $F_{96}$ | -1 |
| $F_{97}$ | 1 |
| $F_{98}$ | -1 |
| $F_{99}$ | 1 |
| $F_{100}$ | 1 |
| $F_{101}$ | 1 |
| $F_{102}$ | -1 |
| $F_{103}$ | -1 |
| $F_{104}$ | -1 |
| $F_{105}$ | 1 |
| $F_{106}$ | -1 |
| $F_{107}$ | 1 |
| $F_{108}$ | 1 |
| $F_{109}$ | 1 |
| $F_{110}$ | -1 |
| $F_{111}$ | -1 |
| $F_{112}$ | -1 |
| $F_{113}$ | -1 |
| $F_{114}$ | 1 |
| $F_{115}$ | -1 |
| $F_{116}$ | -1 |
| $F_{117}$ | -1 |
| $F_{118}$ | 1 |
| $F_{119}$ | 1 |
| $F_{120}$ | 1 |
| $F_{121}$ | -1 |
| $F_{122}$ | 1 |
| $F_{123}$ | -1 |
| $F_{124}$ | -1 |
| $F_{125}$ | -1 |
| $F_{126}$ | 1 |
| $F_{127}$ | 1 |
| $F_{128}$ | 1 | and the second spectrally flattened 128-length sequence defined as proportional to:

| Sequence Element | Value |
|---|---|
| $F'_{1}$ | 1.2947 |
| $F'_{2}$ | -0.8188 |
| $F'_{3}$ | 0.9007 |
| $F'_{4}$ | 0.7786 |
| $F'_{5}$ | 0.6301 |
| $F'_{6}$ | -0.1283 |
| $F'_{7}$ | -0.7972 |
| $F'_{8}$ | -0.3897 |
| $F'_{9}$ | 1.1794 |
| $F'_{10}$ | -1.2592 |
| $F'_{11}$ | 0.8136 |
| $F'_{12}$ | 0.8872 |
| $F'_{13}$ | 0.5797 |
| $F'_{14}$ | -1.2304 |
| $F'_{15}$ | -0.5628 |
| $F'_{16}$ | -0.8272 |
| $F'_{17}$ | -1.5418 |
| $F'_{18}$ | 1.2804 |
| $F'_{19}$ | -1.1524 |
| $F'_{20}$ | -0.9846 |
| $F'_{21}$ | -0.9178 |
| $F'_{22}$ | 1.1834 |
| $F'_{23}$ | 0.4293 |
| $F'_{24}$ | 0.9021 |
| $F'_{25}$ | 1.1152 |
| $F'_{26}$ | -0.9828 |
| $F'_{27}$ | 0.7891 |
| $F'_{28}$ | 0.9391 |
| $F'_{29}$ | 0.5944 |
| $F'_{30}$ | -0.8376 |
| $F'_{31}$ | -0.5320 |
| $F'_{32}$ | -0.6335 |
| $F'_{33}$ | -0.9973 |
| $F'_{34}$ | 0.8548 |
| $F'_{35}$ | -0.6963 |
| $F'_{36}$ | -0.6874 |
| $F'_{37}$ | -0.5015 |
| $F'_{38}$ | 0.7003 |
| $F'_{39}$ | 0.3582 |
| $F'_{40}$ | 0.5772 |
| $F'_{41}$ | 0.7421 |
| $F'_{42}$ | -0.6766 |
| $F'_{43}$ | 0.6242 |
| $F'_{44}$ | 0.4241 |
| $F'_{45}$ | 0.5891 |
| $F'_{46}$ | -0.9045 |
| $F'_{47}$ | 0.1625 |
| $F'_{48}$ | -0.5105 |
| $F'_{49}$ | -1.4187 |
| $F'_{50}$ | 1.5169 |
| $F'_{51}$ | -0.9580 |
| $F'_{52}$ | -1.1237 |
| $F'_{53}$ | -0.6782 |
| $F'_{54}$ | 1.3557 |
| $F'_{55}$ | 1.0229 |
| $F'_{56}$ | 0.9490 |
| $F'_{57}$ | 1.6308 |
| $F'_{58}$ | -0.9325 |
| $F'_{59}$ | 1.1461 |
| $F'_{60}$ | 1.1675 |
| $F'_{61}$ | 0.8163 |
| $F'_{62}$ | -0.1551 |
| $F'_{63}$ | -0.8657 |
| $F'_{64}$ | -0.3696 |
| $F'_{65}$ | 1.0703 |
| $F'_{66}$ | -0.8625 |
| $F'_{67}$ | 0.6986 |
| $F'_{68}$ | 1.0989 |
| $F'_{69}$ | 0.4600 |
| $F'_{70}$ | -0.6559 |
| $F'_{71}$ | -0.6087 |
| $F'_{72}$ | -0.4206 |
| $F'_{73}$ | -0.8454 |
| $F'_{74}$ | 1.0317 |
| $F'_{75}$ | -0.7624 |
| $F'_{76}$ | 0.0619 |

-continued

| Sequence Element | Value |
|---|---|
| $F'_{77}$ | −0.7311 |
| $F'_{78}$ | 1.3634 |
| $F'_{79}$ | −0.1379 |
| $F'_{80}$ | 0.8401 |
| $F'_{81}$ | 1.6371 |
| $F'_{82}$ | −1.0201 |
| $F'_{83}$ | 0.9243 |
| $F'_{84}$ | 2.0931 |
| $F'_{85}$ | 0.4511 |
| $F'_{86}$ | 0.0768 |
| $F'_{87}$ | −1.7974 |
| $F'_{88}$ | −0.4685 |
| $F'_{89}$ | 1.4727 |
| $F'_{90}$ | −1.3387 |
| $F'_{91}$ | 0.7779 |
| $F'_{92}$ | 2.0080 |
| $F'_{93}$ | 0.3026 |
| $F'_{94}$ | −0.4263 |
| $F'_{95}$ | −1.9751 |
| $F'_{96}$ | −0.8421 |
| $F'_{97}$ | 0.9516 |
| $F'_{98}$ | −1.2593 |
| $F'_{99}$ | 0.4594 |
| $F'_{100}$ | 1.3038 |
| $F'_{101}$ | 0.1090 |
| $F'_{102}$ | −0.5082 |
| $F'_{103}$ | −1.8181 |
| $F'_{104}$ | −0.7747 |
| $F'_{105}$ | 0.7678 |
| $F'_{106}$ | −1.5342 |
| $F'_{107}$ | 0.4914 |
| $F'_{108}$ | 0.7197 |
| $F'_{109}$ | 0.3353 |
| $F'_{110}$ | −1.5832 |
| $F'_{111}$ | −0.9947 |
| $F'_{112}$ | −1.0329 |
| $F'_{113}$ | −1.9669 |
| $F'_{114}$ | 0.9946 |
| $F'_{115}$ | −1.3273 |
| $F'_{116}$ | −1.5572 |
| $F'_{117}$ | −0.8746 |
| $F'_{118}$ | 0.0579 |
| $F'_{119}$ | 1.2269 |
| $F'_{120}$ | 0.4497 |
| $F'_{121}$ | −1.4751 |
| $F'_{122}$ | 1.3897 |
| $F'_{123}$ | −0.9922 |
| $F'_{124}$ | −1.2950 |
| $F'_{125}$ | −0.6839 |
| $F'_{126}$ | 1.2113 |
| $F'_{127}$ | 1.0559 |
| $F'_{128}$ | 0.8147 | when the received signal contains the third preamble, the despreader using one of the third 128-length sequence and the third spectrally flattened 128-length sequence, the third 128-length sequence defined as proportional to:

| Sequence Element | Value |
|---|---|
| $J_1$ | 1 |
| $J_2$ | 1 |
| $J_3$ | 1 |
| $J_4$ | −1 |
| $J_5$ | −1 |
| $J_6$ | −1 |
| $J_7$ | 1 |
| $J_8$ | −1 |
| $J_9$ | 1 |
| $J_{10}$ | 1 |

-continued

| Sequence Element | Value |
|---|---|
| $J_{11}$ | 1 |
| $J_{12}$ | −1 |
| $J_{13}$ | −1 |
| $J_{14}$ | −1 |
| $J_{15}$ | 1 |
| $J_{16}$ | −1 |
| $J_{17}$ | −1 |
| $J_{18}$ | −1 |
| $J_{19}$ | −1 |
| $J_{20}$ | 1 |
| $J_{21}$ | 1 |
| $J_{22}$ | 1 |
| $J_{23}$ | −1 |
| $J_{24}$ | 1 |
| $J_{25}$ | −1 |
| $J_{26}$ | −1 |
| $J_{27}$ | −1 |
| $J_{28}$ | 1 |
| $J_{29}$ | 1 |
| $J_{30}$ | 1 |
| $J_{31}$ | −1 |
| $J_{32}$ | 1 |
| $J_{33}$ | −1 |
| $J_{34}$ | −1 |
| $J_{35}$ | −1 |
| $J_{36}$ | 1 |
| $J_{37}$ | 1 |
| $J_{38}$ | 1 |
| $J_{39}$ | −1 |
| $J_{40}$ | 1 |
| $J_{41}$ | −1 |
| $J_{42}$ | −1 |
| $J_{43}$ | −1 |
| $J_{44}$ | 1 |
| $J_{45}$ | 1 |
| $J_{46}$ | 1 |
| $J_{47}$ | −1 |
| $J_{48}$ | 1 |
| $J_{49}$ | 1 |
| $J_{50}$ | 1 |
| $J_{51}$ | 1 |
| $J_{52}$ | −1 |
| $J_{53}$ | −1 |
| $J_{54}$ | −1 |
| $J_{55}$ | 1 |
| $J_{56}$ | −1 |
| $J_{57}$ | −1 |
| $J_{58}$ | −1 |
| $J_{59}$ | −1 |
| $J_{60}$ | 1 |
| $J_{61}$ | 1 |
| $J_{62}$ | 1 |
| $J_{63}$ | −1 |
| $J_{64}$ | 1 |
| $J_{65}$ | −1 |
| $J_{66}$ | −1 |
| $J_{67}$ | −1 |
| $J_{68}$ | 1 |
| $J_{69}$ | 1 |
| $J_{70}$ | 1 |
| $J_{71}$ | −1 |
| $J_{72}$ | 1 |
| $J_{73}$ | 1 |
| $J_{74}$ | 1 |
| $J_{75}$ | 1 |
| $J_{76}$ | −1 |
| $J_{77}$ | −1 |
| $J_{78}$ | −1 |
| $J_{79}$ | 1 |
| $J_{80}$ | −1 |
| $J_{81}$ | −1 |
| $J_{82}$ | −1 |
| $J_{83}$ | −1 |
| $J_{84}$ | 1 |
| $J_{85}$ | 1 |
| $J_{86}$ | 1 |

| Sequence Element | Value |
| --- | --- |
| $J_{87}$ | −1 |
| $J_{88}$ | 1 |
| $J_{89}$ | 1 |
| $J_{90}$ | 1 |
| $J_{91}$ | 1 |
| $J_{92}$ | −1 |
| $J_{93}$ | −1 |
| $J_{94}$ | −1 |
| $J_{95}$ | 1 |
| $J_{96}$ | −1 |
| $J_{97}$ | −1 |
| $J_{98}$ | −1 |
| $J_{99}$ | −1 |
| $J_{100}$ | 1 |
| $J_{101}$ | 1 |
| $J_{102}$ | 1 |
| $J_{103}$ | −1 |
| $J_{104}$ | 1 |
| $J_{105}$ | 1 |
| $J_{106}$ | 1 |
| $J_{107}$ | 1 |
| $J_{108}$ | −1 |
| $J_{109}$ | −1 |
| $J_{110}$ | −1 |
| $J_{111}$ | 1 |
| $J_{112}$ | −1 |
| $J_{113}$ | −1 |
| $J_{114}$ | −1 |
| $J_{115}$ | −1 |
| $J_{116}$ | 1 |
| $J_{117}$ | 1 |
| $J_{118}$ | 1 |
| $J_{119}$ | −1 |
| $J_{120}$ | 1 |
| $J_{121}$ | −1 |
| $J_{122}$ | −1 |
| $J_{123}$ | −1 |
| $J_{124}$ | 1 |
| $J_{125}$ | 1 |
| $J_{126}$ | 1 |
| $J_{127}$ | −1 |
| $J_{128}$ | 1 | and the third spectrally flattened 128-length sequence defined as proportional to:

| Sequence Element | Value |
| --- | --- |
| $J'_{1}$ | 0.8147 |
| $J'_{2}$ | 1.0559 |
| $J'_{3}$ | 1.2113 |
| $J'_{4}$ | −0.6839 |
| $J'_{5}$ | −1.2950 |
| $J'_{6}$ | −0.9922 |
| $J'_{7}$ | 1.3897 |
| $J'_{8}$ | −1.4751 |
| $J'_{9}$ | 0.4497 |
| $J'_{10}$ | 1.2269 |
| $J'_{11}$ | 0.0579 |
| $J'_{12}$ | −0.8746 |
| $J'_{13}$ | −1.5572 |
| $J'_{14}$ | −1.3273 |
| $J'_{15}$ | 0.9946 |
| $J'_{16}$ | −1.9669 |
| $J'_{17}$ | −1.0329 |
| $J'_{18}$ | −0.9947 |
| $J'_{19}$ | −1.5832 |
| $J'_{20}$ | 0.3353 |
| $J'_{21}$ | 0.7197 |
| $J'_{22}$ | 0.4914 |
| $J'_{23}$ | −1.5342 |
| $J'_{24}$ | 0.7678 |
| $J'_{25}$ | −0.7747 |
| $J'_{26}$ | −1.8181 |
| $J'_{27}$ | −0.5082 |
| $J'_{28}$ | 0.1090 |
| $J'_{29}$ | 1.3038 |
| $J'_{30}$ | 0.4594 |
| $J'_{31}$ | −1.2593 |
| $J'_{32}$ | 0.9516 |
| $J'_{33}$ | −0.8421 |
| $J'_{34}$ | −1.9751 |
| $J'_{35}$ | −0.4263 |
| $J'_{36}$ | 0.3026 |
| $J'_{37}$ | 2.0080 |
| $J'_{38}$ | 0.7779 |
| $J'_{39}$ | −1.3387 |
| $J'_{40}$ | 1.4727 |
| $J'_{41}$ | −0.4685 |
| $J'_{42}$ | −1.7974 |
| $J'_{43}$ | 0.0768 |
| $J'_{44}$ | 0.4511 |
| $J'_{45}$ | 2.0931 |
| $J'_{46}$ | 0.9243 |
| $J'_{47}$ | −1.0201 |
| $J'_{48}$ | 1.6371 |
| $J'_{49}$ | 0.8401 |
| $J'_{50}$ | −0.1379 |
| $J'_{51}$ | 1.3634 |
| $J'_{52}$ | −0.7311 |
| $J'_{53}$ | 0.0619 |
| $J'_{54}$ | −0.7624 |
| $J'_{55}$ | 1.0317 |
| $J'_{56}$ | −0.8454 |
| $J'_{57}$ | −0.4206 |
| $J'_{58}$ | −0.6087 |
| $J'_{59}$ | −0.6559 |
| $J'_{60}$ | 0.4600 |
| $J'_{61}$ | 1.0989 |
| $J'_{62}$ | 0.6986 |
| $J'_{63}$ | −0.8625 |
| $J'_{64}$ | 1.0703 |
| $J'_{65}$ | −0.3696 |
| $J'_{66}$ | −0.8657 |
| $J'_{67}$ | −0.1551 |
| $J'_{68}$ | 0.8163 |
| $J'_{69}$ | 1.1675 |
| $J'_{70}$ | 1.1461 |
| $J'_{71}$ | −0.9325 |
| $J'_{72}$ | 1.6308 |
| $J'_{73}$ | 0.9490 |
| $J'_{74}$ | 1.0229 |
| $J'_{75}$ | 1.3557 |
| $J'_{76}$ | −0.6782 |
| $J'_{77}$ | −1.1237 |
| $J'_{78}$ | −0.9580 |
| $J'_{79}$ | 1.5169 |
| $J'_{80}$ | −1.4187 |
| $J'_{81}$ | −0.5105 |
| $J'_{82}$ | 0.1625 |
| $J'_{83}$ | −0.9045 |
| $J'_{84}$ | 0.5891 |
| $J'_{85}$ | 0.4241 |
| $J'_{86}$ | 0.6242 |
| $J'_{87}$ | −0.6766 |
| $J'_{88}$ | 0.7421 |
| $J'_{89}$ | 0.5772 |
| $J'_{90}$ | 0.3582 |
| $J'_{91}$ | 0.7003 |
| $J'_{92}$ | −0.5015 |
| $J'_{93}$ | −0.6874 |
| $J'_{94}$ | −0.6963 |
| $J'_{95}$ | 0.8548 |
| $J'_{96}$ | −0.9973 |
| $J'_{97}$ | −0.6335 |
| $J'_{98}$ | −0.5320 |
| $J'_{99}$ | −0.8376 |

-continued

| Sequence Element | Value |
|---|---|
| $J'_{100}$ | 0.5944 |
| $J'_{101}$ | 0.9391 |
| $J'_{102}$ | 0.7891 |
| $J'_{103}$ | −0.9828 |
| $J'_{104}$ | 1.1152 |
| $J'_{105}$ | 0.9021 |
| $J'_{106}$ | 0.4293 |
| $J'_{107}$ | 1.1834 |
| $J'_{108}$ | −0.9178 |
| $J'_{109}$ | −0.9846 |
| $J'_{110}$ | −1.1524 |
| $J'_{111}$ | 1.2804 |
| $J'_{112}$ | −1.5418 |
| $J'_{113}$ | −0.8272 |
| $J'_{114}$ | −0.5628 |
| $J'_{115}$ | −1.2304 |
| $J'_{116}$ | 0.5797 |
| $J'_{117}$ | 0.8872 |
| $J'_{118}$ | 0.8136 |
| $J'_{119}$ | −1.2592 |

-continued

| Sequence Element | Value |
|---|---|
| $J'_{120}$ | 1.1794 |
| $J'_{121}$ | −0.3897 |
| $J'_{122}$ | −0.7972 |
| $J'_{123}$ | −0.1283 |
| $J'_{124}$ | 0.6301 |
| $J'_{125}$ | 0.7786 |
| $J'_{126}$ | 0.9007 |
| $J'_{127}$ | −0.8188 |
| $J'_{128}$ | 1.2947. |

22. The wireless device of claim 21, wherein the preamble is based on transforming a 128-length bi-phase valued sequence to adapt an arbitrary spectral shape which includes enhancing spectral energy density of the preamble, the 128-length bi-phase valued sequence based on the one of the first, second and third 128-length sequences.

* * * * *